United States Patent
Bass et al.

(10) Patent No.: US 11,896,164 B2
(45) Date of Patent: Feb. 13, 2024

(54) PORTABLE BLENDER

(71) Applicant: TROJAN HORSE INCORPORATED, Saratoga, CA (US)

(72) Inventors: Dakota Adams Bass, Foster City, CA (US); Matthew Ryan Moore, Saratoga, CA (US)

(73) Assignee: TROJAN HORSE INCORPORATED, Scotts Valley, CA (US)

( * ) Notice: Subject to any disclaimer, the term of this patent is extended or adjusted under 35 U.S.C. 154(b) by 538 days.

(21) Appl. No.: 17/117,245

(22) Filed: Dec. 10, 2020

(65) Prior Publication Data

US 2022/0183506 A1 Jun. 16, 2022

(51) Int. Cl.
*A47J 43/00* (2006.01)
*A47J 43/07* (2006.01)
(Continued)

(52) U.S. Cl.
CPC ......... *A47J 43/0766* (2013.01); *A47J 43/046* (2013.01); *B01F 27/808* (2022.01);
(Continued)

(58) Field of Classification Search
CPC . A47J 43/0766; B01F 33/5011; B01F 27/808; B01F 2101/06; H02K 11/33;
(Continued)

(56) References Cited

U.S. PATENT DOCUMENTS 4,487,509 A * 12/1984 Boyce ................... A47J 43/046
366/279
4,887,909 A * 12/1989 Bennett ................. A47J 43/046
241/285.2
(Continued)

FOREIGN PATENT DOCUMENTS

CN 203885247 10/2014
CN 109528031 3/2019
(Continued)

OTHER PUBLICATIONS

CN 209984085 (Year: 2020).*
(Continued)

*Primary Examiner* — Anshu Bhatia
(74) *Attorney, Agent, or Firm* — STINSON LLP

(57) ABSTRACT

An assembly for a portable blender. The assembly having a housing that is configured for coupling to a container. The assembly has at least one battery, a motor electrically connected to the battery, a blade coupled to the motor, and a user input device operable to cause power to be sent from the battery to the motor so that the motor rotates the blade. At least a portion of the blade is positioned outside of the housing so that the blade is configured to be positioned in an interior space of the container when the housing is coupled to the container. The assembly may include a plurality of batteries each positioned radially outward from the motor with the batteries positioned circumferentially around the motor. A portable blender including the assembly and a
(Continued)

container. The container having a dual-wall, vacuum insulated construction.

32 Claims, 28 Drawing Sheets

(51) Int. Cl.
| | |
|---|---|
| *H02J 7/00* | (2006.01) |
| *H02K 11/00* | (2016.01) |
| *H02K 11/33* | (2016.01) |
| *B65D 81/38* | (2006.01) |
| *A47J 43/046* | (2006.01) |
| *B01F 27/808* | (2022.01) |
| *B01F 33/501* | (2022.01) |
| *B01F 101/06* | (2022.01) |

(52) U.S. Cl.
CPC ...... *B01F 33/5011* (2022.01); *B65D 81/3841* (2013.01); *H02J 7/0013* (2013.01); *H02J 7/0042* (2013.01); *H02K 11/0094* (2013.01); *H02K 11/33* (2016.01); *B01F 2101/06* (2022.01); *H02K 2211/03* (2013.01)

(58) Field of Classification Search
CPC ............. H02K 11/0094; B65D 81/3841; H02J 7/0013; H02J 7/0042
See application file for complete search history.

(56) References Cited

U.S. PATENT DOCUMENTS

| | | | |
|---|---|---|---|
| 9,675,212 | B2 | 6/2017 | Hewitt et al. |
| 10,143,980 | B1 | 12/2018 | Marko |
| 10,383,482 | B1 | 8/2019 | Pamplin |
| D871,831 | S | 1/2020 | Liu |
| 10,702,837 | B1 | 7/2020 | Pamplin |
| 2011/0024537 | A1 | 2/2011 | Gonzalez |
| 2014/0301155 | A1 | 10/2014 | Montgomery |
| 2015/0165402 | A1 | 6/2015 | King |
| 2020/0114322 | A1 | 4/2020 | Bertsch |
| 2020/0205615 | A1* | 7/2020 | Pamplin .............. A47J 43/0766 |

FOREIGN PATENT DOCUMENTS

| | | |
|---|---|---|
| CN | 209121846 | 7/2019 |
| CN | 209421682 | 9/2019 |
| CN | 209661231 | 11/2019 |
| CN | 209733392 | 12/2019 |
| CN | 209932362 | 1/2020 |
| CN | 209984085 U | 1/2020 |
| CN | 209995875 | 1/2020 |
| CN | 210095437 | 2/2020 |
| CN | 210842754 | 6/2020 |
| CN | 211022125 | 7/2020 |
| GB | 2506926 | 4/2014 |
| WO | WO 2018/134341 A1 | 7/2018 |

OTHER PUBLICATIONS

CN 209984085 Machine Translation (Year: 2020).*
Oster Blend Active Portable Blender | Personal Blender, Gray; https://www.oster.com/new-products/oster-blend-active-portable-blender-%7C-personal-blender-gray/BLSTPP-G00-000.html#; Sep. 15, 2020.
International Search Report and Written Opinion dated Feb. 23, 2022 in related PCT application PCT/US2021/061522 (10 pgs).

* cited by examiner

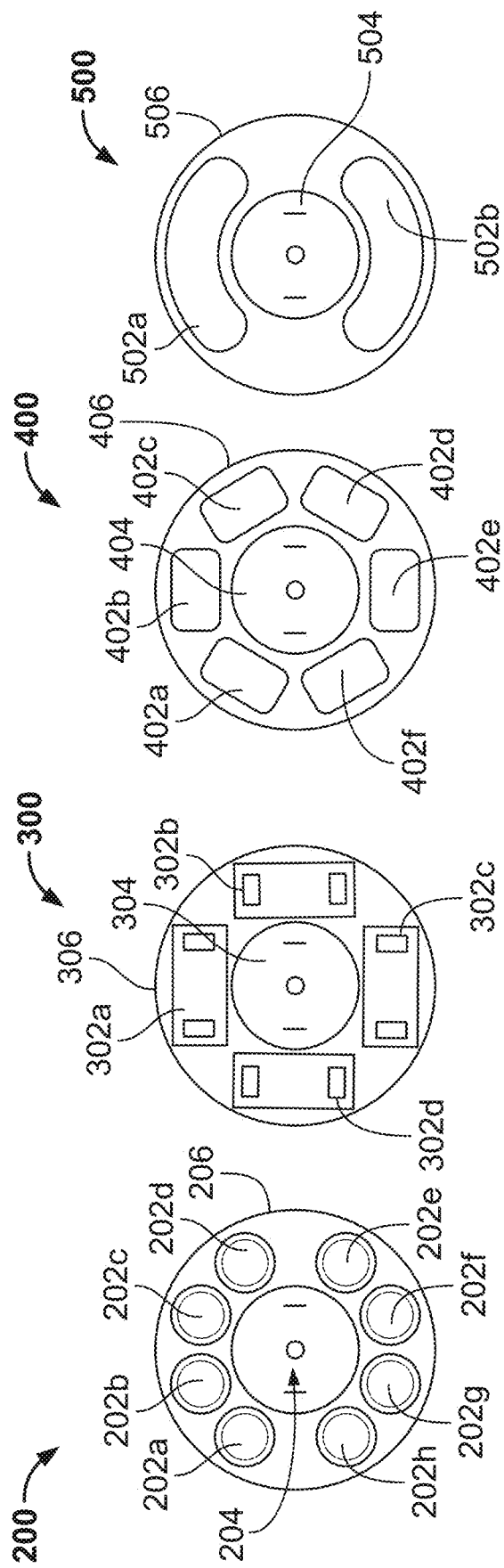

PORTABLE BLENDER

BACKGROUND OF THE INVENTION

1. Field of the Invention

The invention relates generally to blenders and, in particular, to portable blenders.

2. Description of Related Art

A variety of portable blenders are available for blending smoothies and other types of drinks when on the go. For example, BlendJet and Vejo offer portable blenders that have rechargeable batteries. The BlendJet and Vejo portable blenders have blades that are in the base of the container from which a user consumes the blended product. Thus, the user must carry around the entire blender when consuming the product. Further, the products are not designed to maintain a desired hot or cold temperature of the blended product for a long duration of time. Oster also offers a portable blender sold under the name Blend Active. The blades for the Blend Active blender are positioned in a lid that can be removed from the container holding the blended product. Like the BlendJet and Vejo portable blenders, however, the Blend Active blender is not suitable for maintaining a desired hot or cold temperature of the blended product for a long duration of time. Further, none of the currently available portable blenders are powerful enough to match the capabilities of a typical countertop blender powered by mains electricity.

BRIEF SUMMARY OF THE INVENTION

One aspect of the invention described herein is directed to an assembly for a portable blender. The assembly has a housing that is configured for coupling to a container. A motor is positioned at least partially in the housing. At least one battery is electrically connected to the motor and positioned at least partially in the housing. The battery may be directly connected to the motor or indirectly connected to the motor (e.g., the battery and the motor may both be connected to a printed circuit board or other control circuitry that allows power to be sent from the battery to the motor when desired). A blade is coupled to the motor. At least a portion of the blade is positioned outside of the housing so that at least a portion of the blade is configured to be positioned in an interior space of the container when the housing is coupled to the container. A user input device is operable to cause power to be sent from the battery to the motor so that the motor rotates the blade.

In some embodiments, the assembly includes a plurality of batteries. Each of the batteries is positioned radially outward from the motor, and the batteries are positioned circumferentially around the motor. The plurality of batteries may be positioned around substantially the entire circumference of the motor.

In some embodiments, an inner surface of the housing has a plurality of receptacles each receiving one of the batteries.

In some embodiments, the plurality of batteries includes a first group of batteries and a second group of batteries. The first group of batteries are electrically connected in parallel to each other, the second group of batteries are electrically connected in parallel to each other, and the first group of batteries are electrically connected in series to the second group of batteries. Another group of batteries, or groups of batteries, may be electrically connected in series to the first and second groups of batteries with the batteries within the other group(s) of batteries electrically connected in parallel to each other. The assembly may include a charging port electrically connected to a battery management system. The battery management system being electrically connected to the plurality of batteries and configured to transmit power from the charging port to the plurality of batteries. The assembly may further include a control system, which is electrically connected to the motor and to at least one of the battery management system or the plurality of batteries. The control system is operable to transmit power from the plurality of batteries to the motor when the user input device is activated. The control system may include a MOSFET, transistor, or other type of switch that is operable to transmit power from the plurality of batteries to the motor when the user input device is activated.

In some embodiments, the assembly includes a safety switch that is configured to sense when the housing is coupled to the container and prevent operation of the motor when the housing is not coupled to the container. The housing may include a seal that is configured to engage the container when the housing is coupled to the container. The seal may be positioned between the safety switch and the container when the housing is coupled to the container.

In some embodiments, the assembly described above is part of a portable blender that also includes a container. The container having an outer wall and an inner wall that is spaced from the outer wall to define an enclosed space positioned between the outer wall and the inner wall. The enclosed space is at least a partial vacuum. The container defines a mouth through which an interior space of the container is accessible. The housing may be configured to be removably coupled to the container so that the housing substantially seals the mouth of the container. Alternatively, the housing may be configured to be coupled to a first end of the container, with the mouth being at a second end of the container.

Additional aspects of the invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means of the instrumentalities and combinations particularly pointed out in the appended claims.

BRIEF DESCRIPTION OF THE DRAWINGS

FIGS. 22A-D show alternative battery assemblies for the blender cap shown in FIG. 5;

DETAILED DESCRIPTION OF PREFERRED EMBODIMENT

Figure 1:
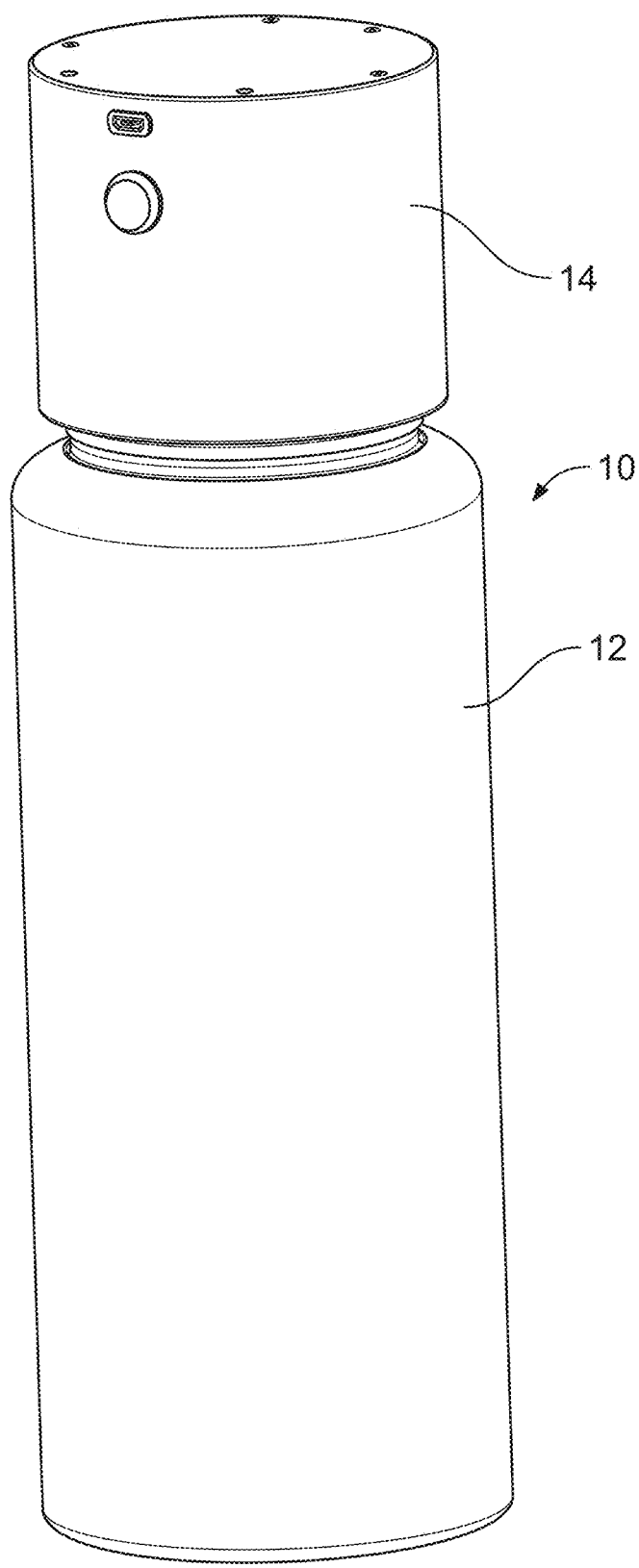
FIG. 1 is a perspective view of a portable blender in accordance with an exemplary embodiment of the invention disclosed herein.

A portable blender in accordance with one exemplary embodiment of the invention described herein is identified generally in FIG. 1 as 10. Portable blender 10 includes a container 12 and an assembly for a blender, or blender cap 14. Blender cap 14 is configured to blend food products, liquid, or other desirable materials within the container 12 when the blender cap 14 is joined to the container, as described in detail below. Blender cap 14 includes rechargeable batteries so that it is portable and can be used to blend materials in any desirable location where access to mains electricity may not be readily available. Container 12 is further dual-walled and vacuum insulated to maintain food products therein at a desirable hot or cold temperature for a long time span. In some embodiments of the invention, the blender cap 14 may be provided as an assembly separate from the container 12.

Figure 2:
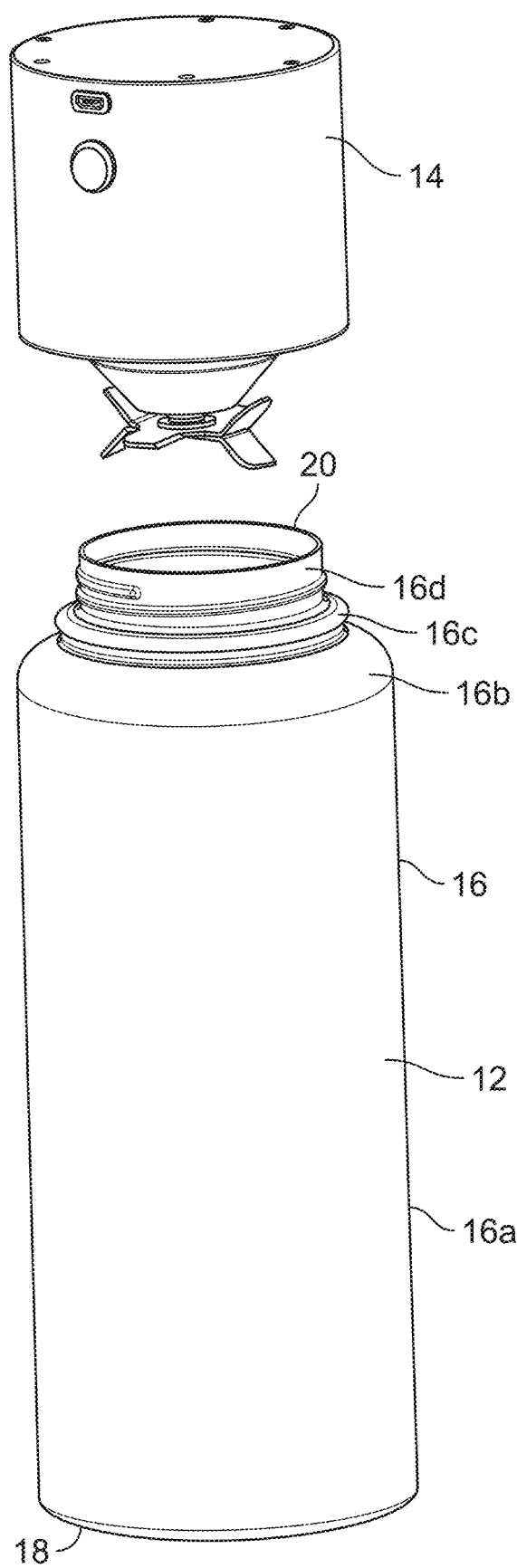
FIG. 2 is a perspective view of the portable blender shown in FIG. 1 showing a blender cap separated from a container.

FIG. 1 shows the blender cap 14 joined to an upper portion of the container 12. FIG. 2 shows the blender cap 14 when it is unscrewed from engagement with the container 12. For example, the blender cap 14 may be removed from the container 12 when filling the container with a food product for blending and for consumption of a blended food product within the container 12. The container 12 includes an outer side wall 16 and a base 18 at the bottom of outer side wall 16. The outer side wall 16 includes a generally cylindrical section 16a extending upward from the base 18, a transition section 16b that extends radially inward from cylindrical section 16a, and a shoulder 16c. A threaded surface 16d extends upward from the shoulder 16c with the shoulder 16c extending radially outward from the threaded surface 16d. The threaded surface 16d is engaged by a threaded surface 19 (FIG. 8) of the blender cap 14 for removably joining the blender cap 14 to the container 12. The threaded surface 16d is an external, male threaded surface positioned on an outside wall of the container 12, whereas the threaded surface 19 (FIG. 8) of the blender cap 14 is a female threaded surface. A mouth 20 or opening of the container 12 is defined by an upper edge of the threaded surface 16d. An interior space 22 (FIG. 4) of the container 12 is accessible through the mouth 20 when the blender cap 14 is removed from engagement with the container 12.

Figure 3:
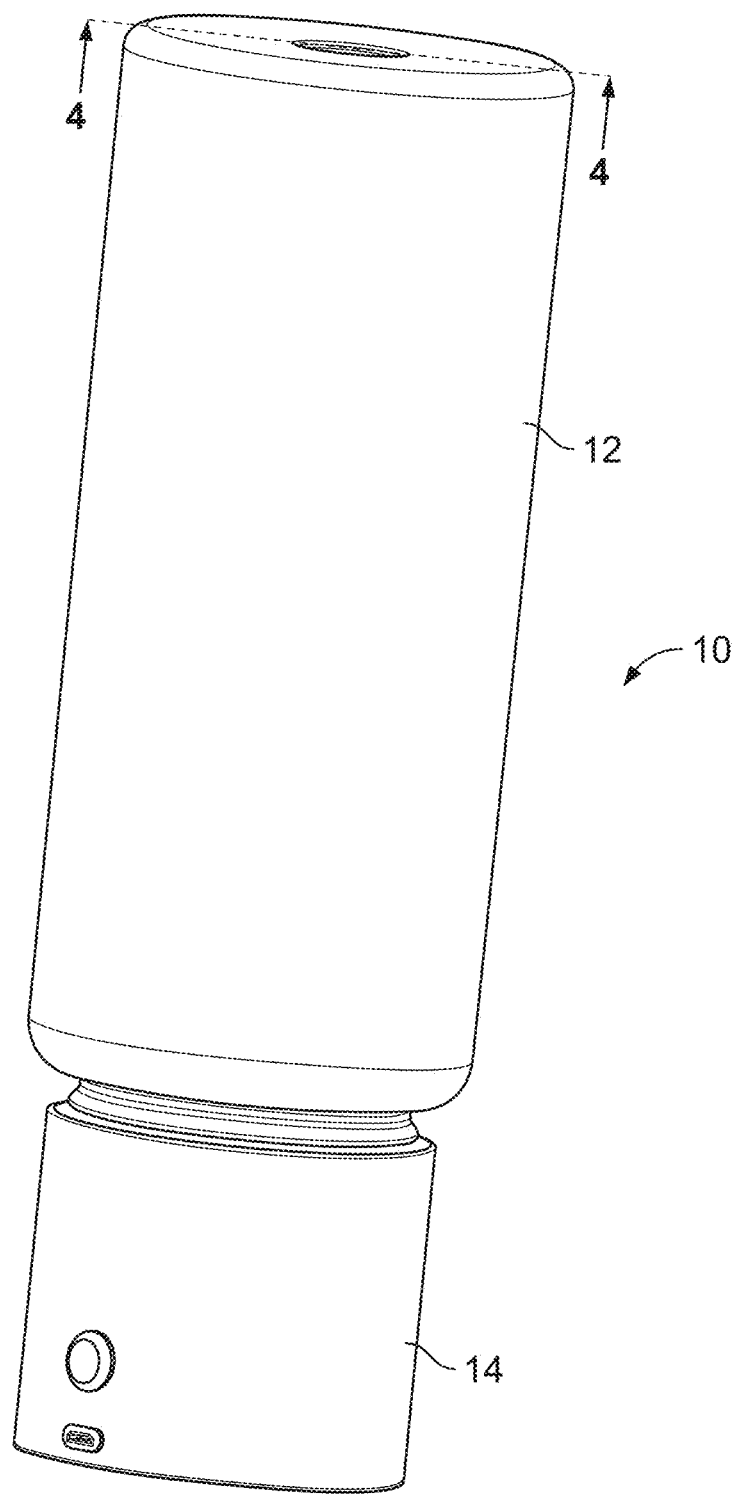
FIG. 3 is a perspective view of the portable blender shown in FIG. 1 showing the blender in an inverted position for blending a food product.

FIG. 3 shows the portable blender 10 in an inverted state with the blender cap 14 positioned below the container 12. Portable blender 10 may be used to blend a food product positioned within the container 12 when in the inverted position shown in FIG. 3.

Figure 4:
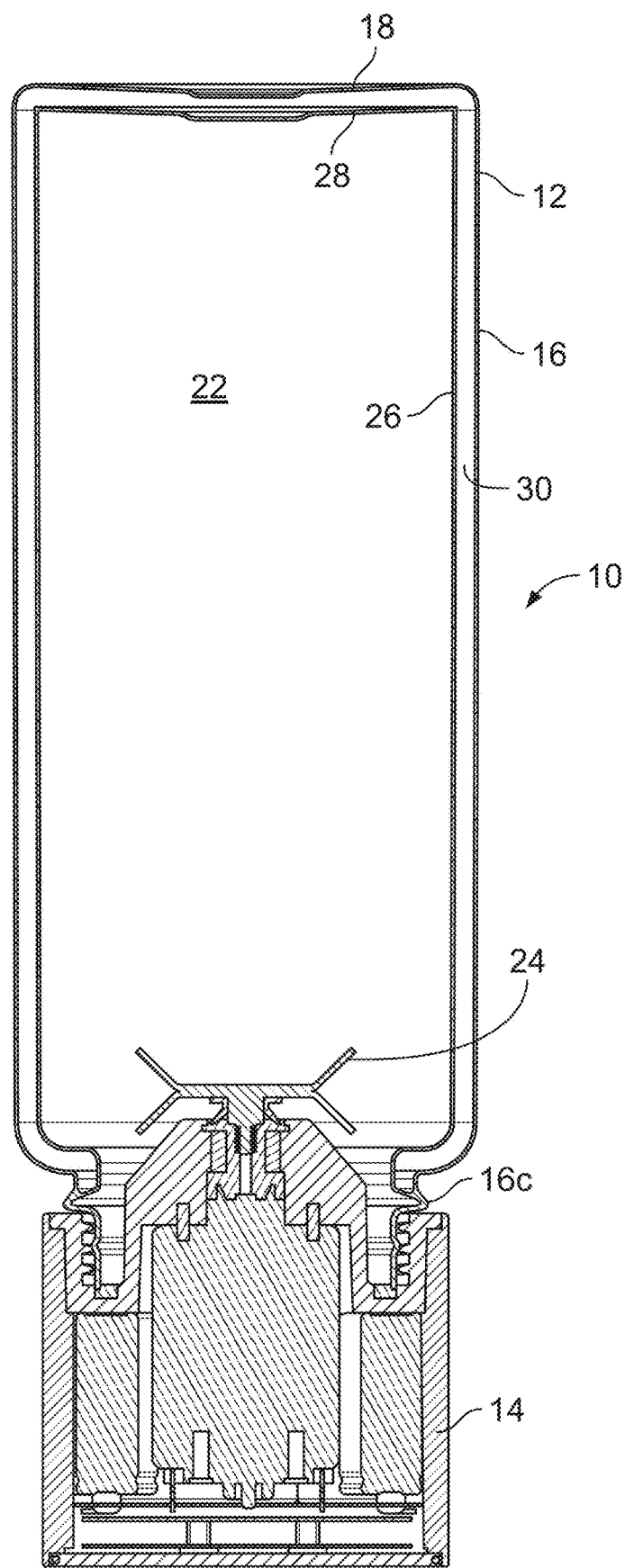
FIG. 4 is a cross-sectional view taken through the line 4-4 shown in FIG. 3.

As shown in FIG. 4, when the blender cap 14 is joined to the container 12, a blade assembly 24 of the blender cap 14 extends into the interior space 22 of the container 12 where it can blend a food product positioned in the interior space 22. The container 12 is a dual wall, vacuum insulated container. In addition to the outer side wall 16, the container 12 includes an inner side wall 26 that is spaced radially inward from the outer side wall 16. The inner side wall 26 is generally cylindrical and is joined to an inner base 28 that is spaced apart from the base 18. The inner side wall 26 and outer side wall 16 are joined together near shoulder 16c to define an enclosed space 30 between the inner side wall 26 and outer side wall 16 and between the base 18 and inner base 28. The enclosed space 30 is at least a partial vacuum. For example, the pressure within the enclosed space 30 is less than atmospheric pressure to improve the thermal insulation of container 12. The pressure within the enclosed space 30 may, for example, be a vacuum in the range of between approximately 100 to 1 Torr. All or portions of the inner side wall 26 and inner base 28 may also be coated or plated to improve the thermal insulation of the container 12. For example, the portions of inner side wall 26 and inner base 28 facing enclosed space 30 may be copper-plated to reflect thermal radiation.

Figure 5:
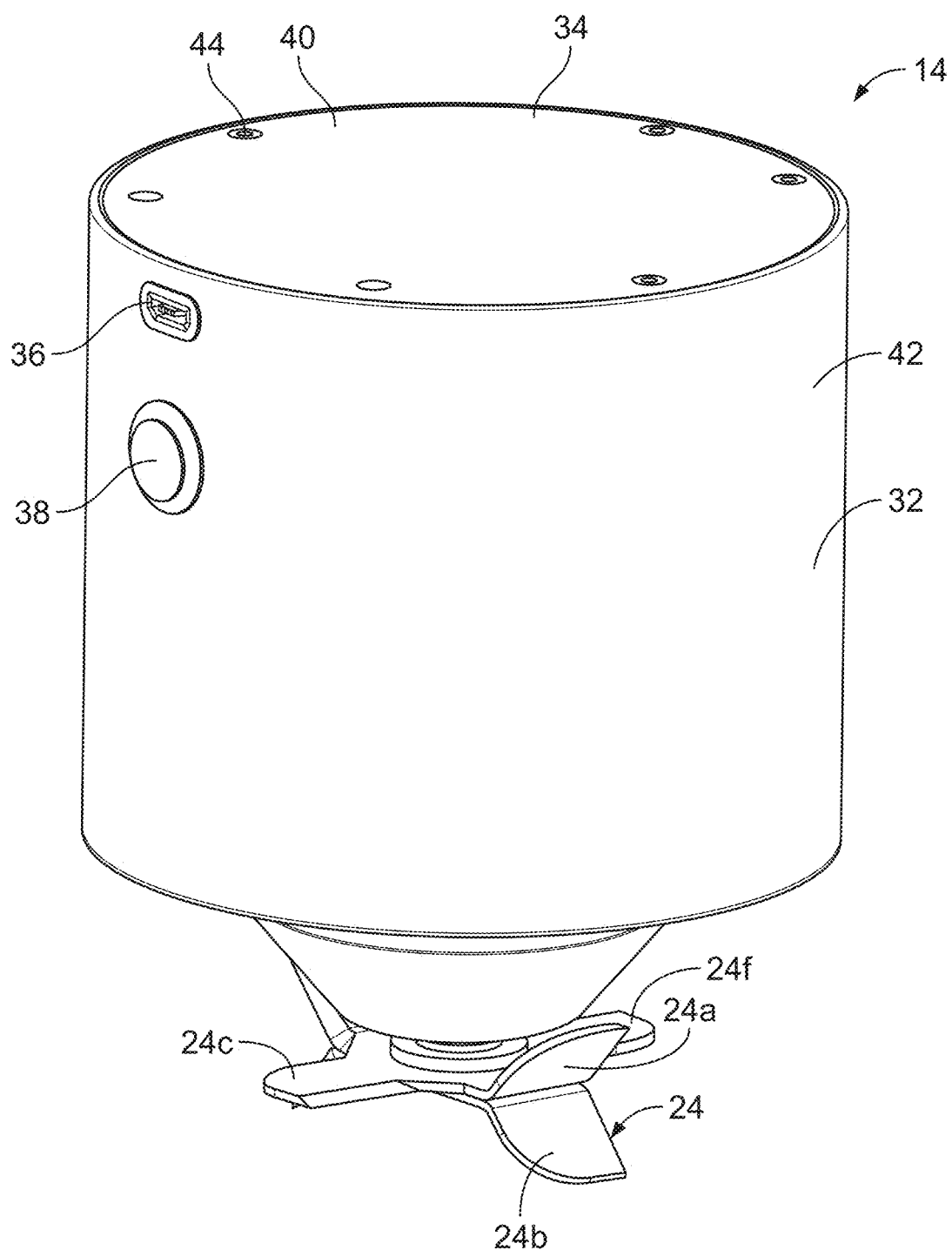
FIG. 5 is a perspective view of the blender cap of the portable blender shown in FIG. 1.

The structure of the blender cap 14 is described in more detail below with reference to FIGS. 5-19. As shown in FIG. 5, the blender cap 14 includes a generally cylindrical housing 32 with an upper surface 34. Blade assembly 24 extends downward away from the housing 32 so that blades 24a-f are positioned outside of the housing 32. A charging port 36 is positioned adjacent the upper surface 34 and is accessible through a hole formed in the housing 32. The charging port 36 may be any type of USB port (e.g., a USB type B micro port, or a USB type C port) or any other type of port configured to receive power for charging batteries of the blender cap 14. In lieu of, or in addition to, charging port 36, blender cap 14 may include structure that allows for the wireless charging of batteries within the housing 32 (e.g., the blender cap 14 may be configured to charge with Qi wireless chargers). A switch 38 is positioned below the charging port 36. As described in more detail below, the switch 38 may include a button that can be depressed by a user to rotate the blade assembly 24 when the blender cap 14 is joined to the container 12. Instead of a push button, switch 38 may be a rocker switch or a capacitive button. It is within the scope of the invention for the blender cap 14 to include other types of user input devices in addition to, or in lieu of switch 38. For example, the blender cap 14 may include a touchscreen or a wireless transceiver (e.g., a Bluetooth or WiFi wireless transceiver) that is configured to receive an instruction from a user that causes the blade assembly 24 to rotate. A lid 40 of the housing 32 is joined to a side wall 42 of the housing 32 with four fasteners, one of which is identified as 44. The side wall 42 may have a height, or distance from the lid 40 to the opposite end of the side wall 42, of between approximately 60-80 mm or approximately 70 mm. The side wall 42 may have a diameter of between approximately 70 to 90 mm or approximately 80 mm.

Figure 6:
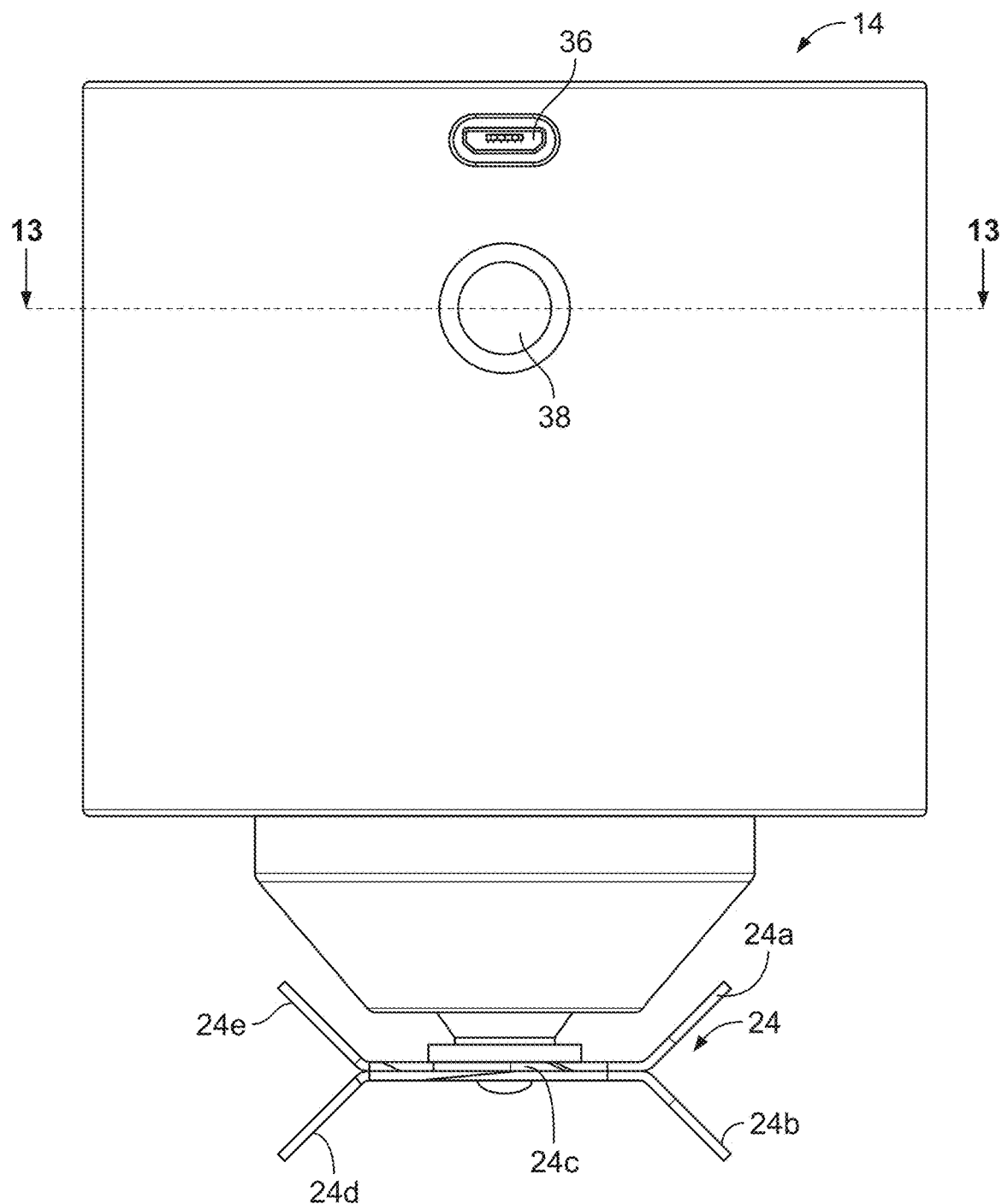
FIG. 6 is a front elevational view of the blender cap shown in FIG. 5.

As shown in FIGS. 5 and 6, the blade assembly 24 includes six blades 24a-f with blades 24c and 24f being generally horizontal to lid 40, blades 24b and 24d angled downward away from lid 40, and blades 24a and 24e angled upward toward lid 40. The blade assembly 24 may include any number of suitable blades positioned in any desirable orientation.

Figure 7:
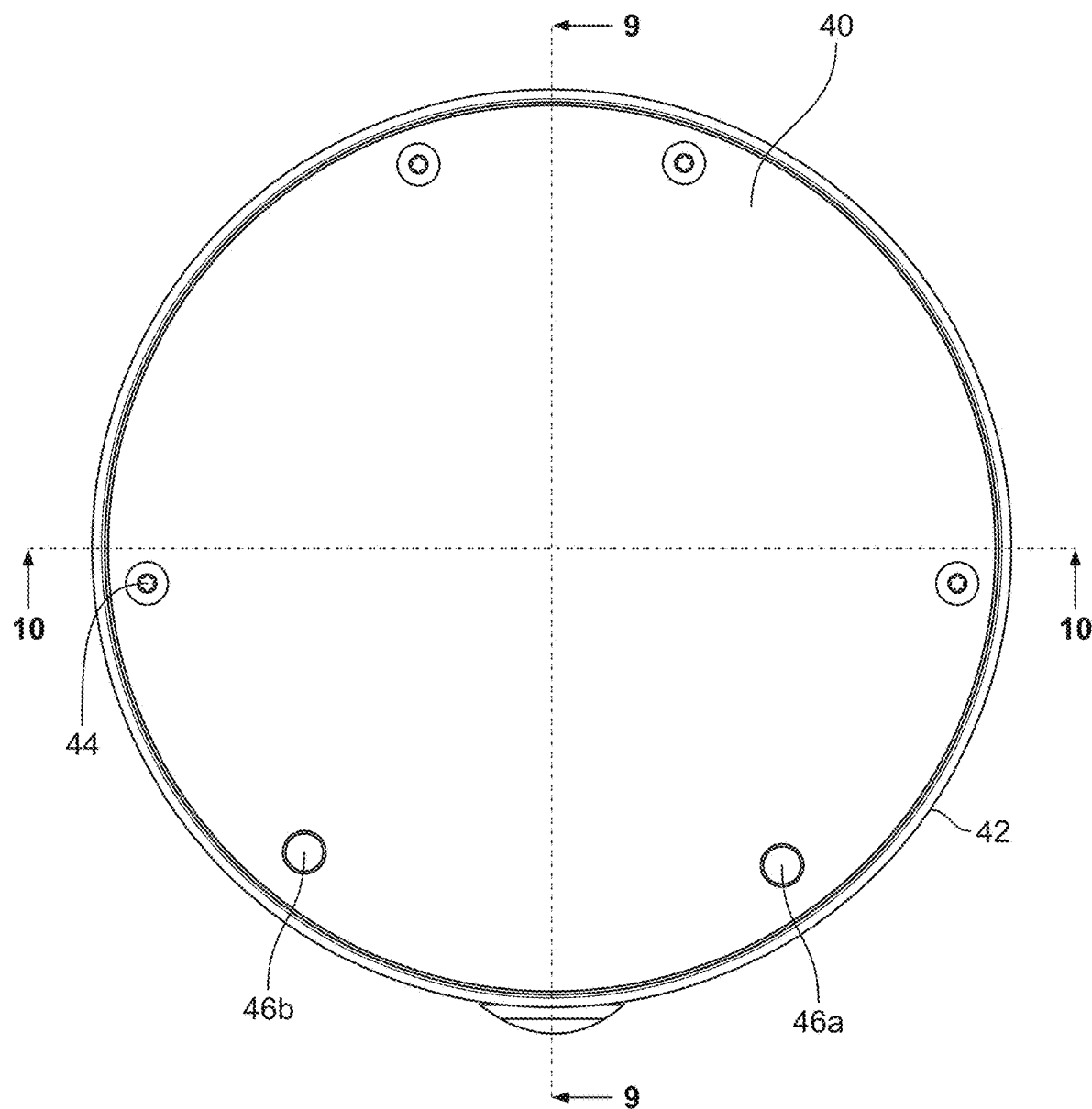
FIG. 7 is a top plan view of the blender cap shown in FIG. 5.

FIG. 7 shows two transparent plugs 46a-b that are inserted through holes in lid 40. The plugs 46a-b are positioned where at least one light source in the housing 32 can emit visible light through the plugs 46a-b that is observable by a user. The light source may emit different colors of light, as described in more detail below, to indicate different states of operation of the blender cap 14.

Figure 8:
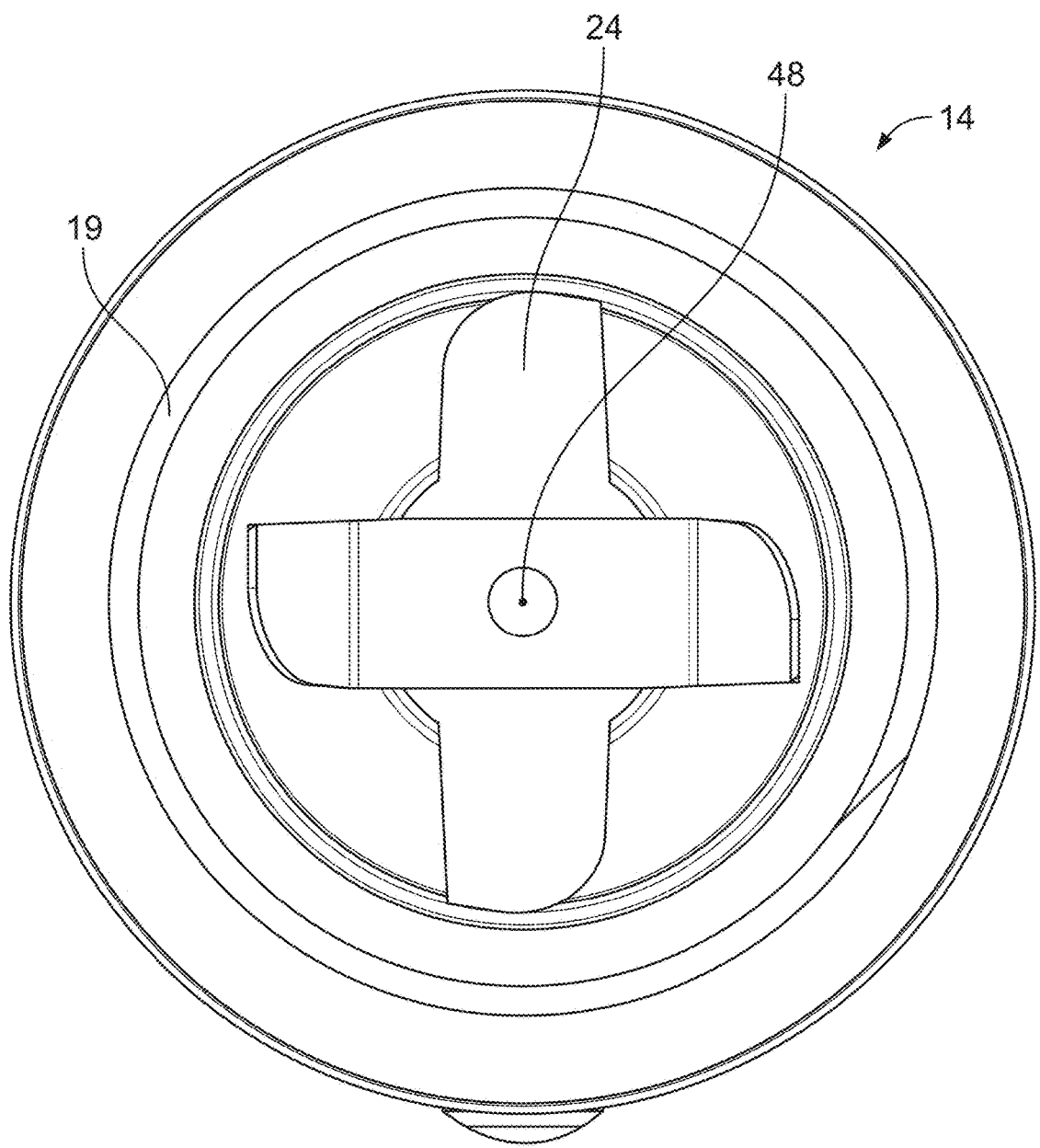
FIG. 8 is a bottom plan view of the blender cap shown in FIG. 5.

As shown in FIG. 8, the blade assembly 24 is generally centered about a longitudinal, central axis 48 of the blender cap 14. The radially outer edges of the blade assembly 24 are spaced apart from the threaded surface 19 of the blender cap 14 to allow space for the threaded surface 16d of the container 12 to engage the threaded surface 19 of the blender cap 14.

Figure 9:
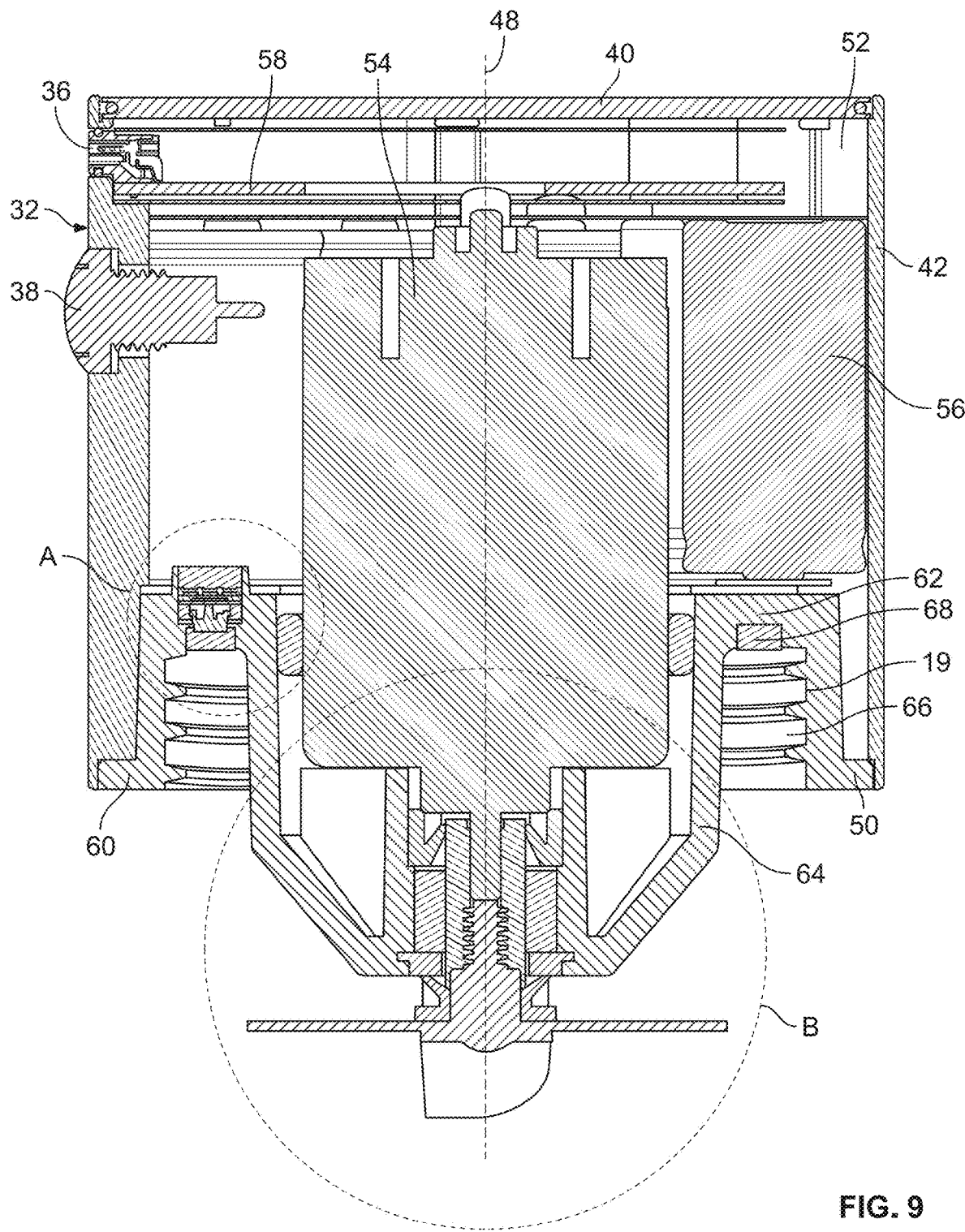
FIG. 9 is a cross-sectional view taken through the line 9-9 of FIG. 7.

Referring to FIG. 9, the housing 32 of the blender cap 14 includes the side wall 42, the lid 40, and a motor base 50 that is joined to a lower portion of the side wall 42. The motor base 50 may be joined to the side wall 42, for example, by friction and adhesive, i.e., the motor base 50 may be press fit into the side wall 42 and also joined to the side wall 42 with an adhesive. A cavity 52 of the housing 32 is defined between the lid 40, the side wall 42, and the motor base 50. A motor 54, battery assembly 56, and printed circuit board 58 are positioned within the cavity 52.

The motor base 50 includes an annular flange 60 that engages a lower surface of the side wall 42, the threaded surface 19 that extends axially inward from the flange 60 toward the cavity 52, an upper wall 62 that extends radially inward from the threaded surface 19, and a protrusion 64 that extends axially downward from the upper wall 62 away from the cavity 52. An annular gap 66 is positioned between the threaded surface 19 and the protrusion 64 for receiving the threaded surface 16d of the container 12. An annular seal 68 is positioned within a notch formed in a lower surface of the upper wall 62. The seal 68 is positioned to engage an upper edge of the threaded surface 16d of the container 12 when the blender cap 14 is joined to the container 12. The seal 68 seals between the container 12 and the blender cap 14 to prevent the food product within the container 12 from leaking out of the portable blender 10 when in use, i.e., the seal 68 seals the mouth 20 of the container 12 when the blender cap 14 is joined to the container 12. The seal 68 may be silicone and press fit and adhered into place in the motor base 50. The seal 68 may be formed from any other suitable material, including a thermoplastic elastomer, thermoplastic polyurethane, rubber, fluoroelastomer (FKM) or nitrile rubber (Buna-N rubber).

The motor 54 is positioned in a center of the cavity 52. The motor 54 is generally cylindrical and extends axially in a direction aligned with the central axis 48 of the blender cap 14. A longitudinal axis of the motor 54 is generally aligned with the central axis 48 of the blender cap 14. The motor 54 extends from adjacent the lid 40 downward into the protrusion 64 of the motor base 50.

The battery assembly 56 includes a plurality of batteries that are each positioned radially outward from the motor 54 between the motor 54 and the side wall 42 of the housing 32. The battery assembly 56 extends circumferentially in an annular orientation around a majority of the motor 54 as described in more detail below. The battery assembly 56 extends axially from above the upper wall 62 of the motor base 50 to adjacent the lid 40.

The printed circuit board 58 is positioned above the motor 54 and battery assembly 56 between the lid 40 and the motor 54 and battery assembly 56.

Figure 10:
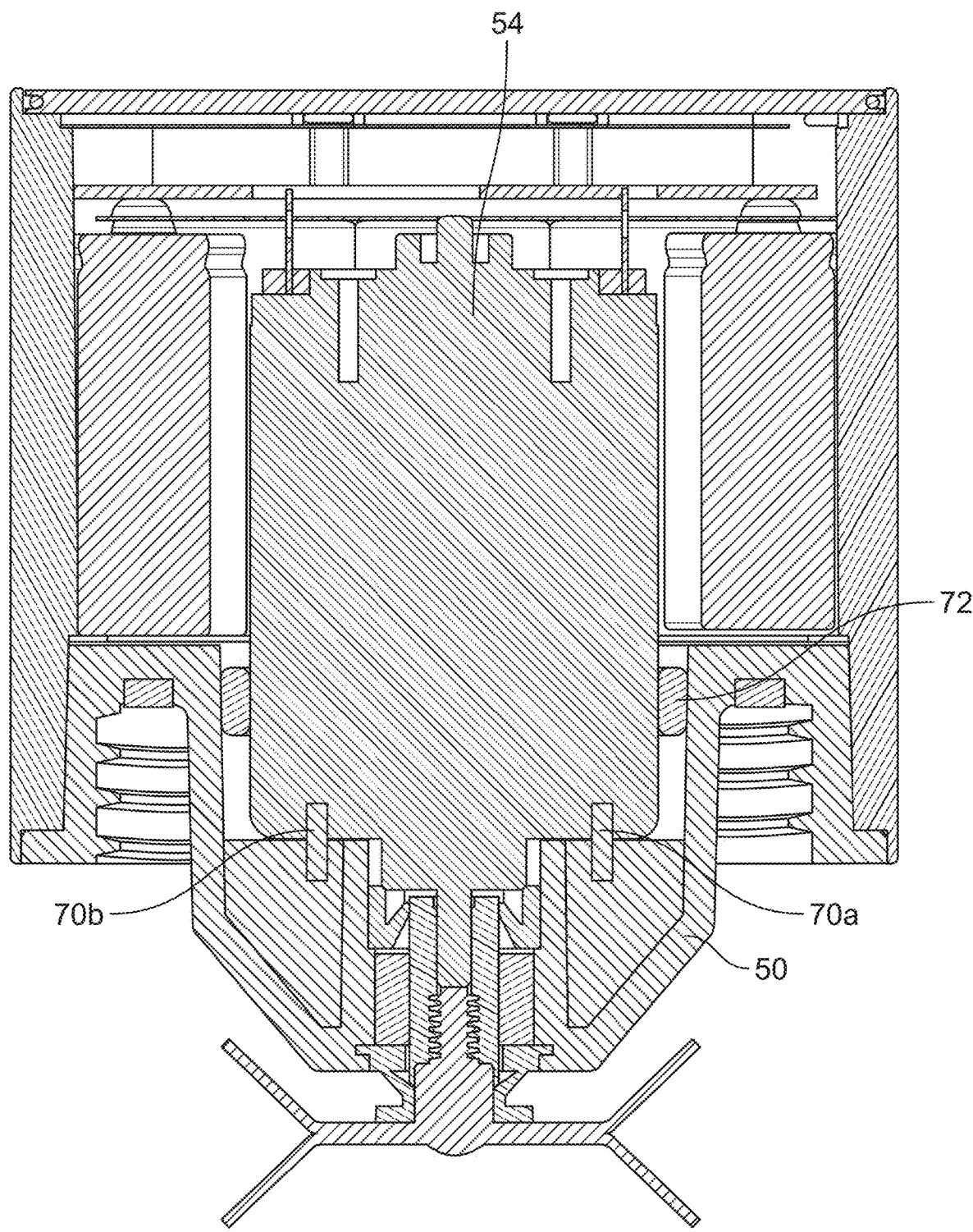
FIG. 10 is a cross-sectional view taken through the line 10-10 of FIG. 7.

As shown in FIG. 10, the motor 54 is coupled to the motor base 50 with two pins 70a and 70b. The pins 70a and 70b are received in holes formed in the motor base 50 and holes formed in the motor 54. A thermoset or thermoplastic potting 72 may further be used to hold the motor 54 in place with respect to the motor base 50. The motor 54 may also be held in place with respect to the motor base 50 with screws or any other desired method of joining. The motor 54 may be any suitable type of motor, including a brushed DC motor, a brushless DC motor, or an AC motor. In one embodiment, the motor 54 may be a 550 watt or 0.7 hp brushed DC motor.

Figure 11:
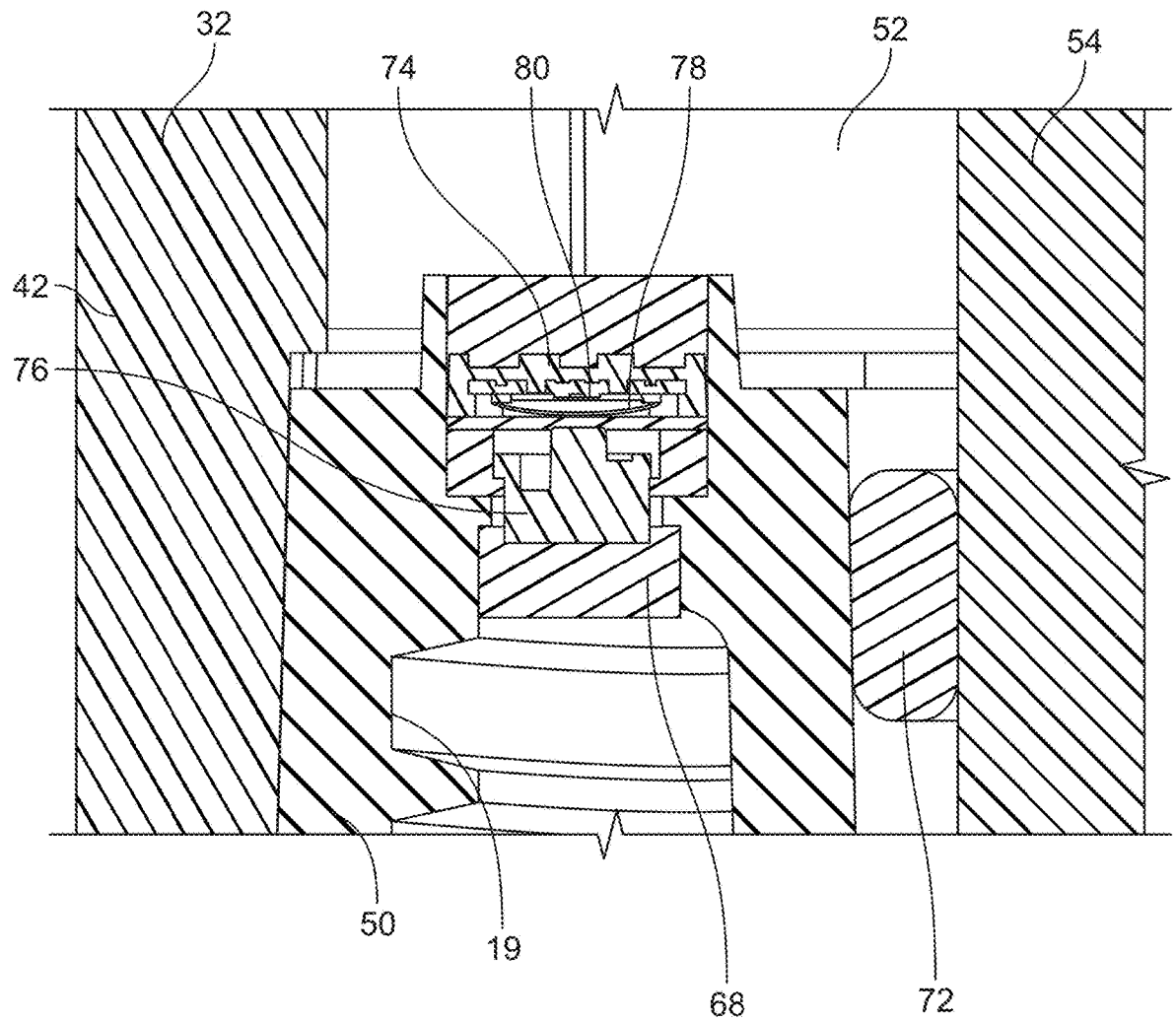
FIG. 11 is a detail view of the area identified as A in FIG. 9.

FIG. 11 shows a safety switch 74 that is positioned above the seal 68 within the cavity 52 of the housing 32. The seal 68 is positioned between the safety switch 74 and the upper edge of the container 12 when the blender cap 14 is joined to the container 12. The safety switch 74 is configured to sense when the blender cap 14 is joined to the container 12 and send a signal to a controller or microcontroller of the blender cap 14, as described in more detail below, when the blender cap 14 is joined to the container 12. The controller prevents operation of the motor 54 unless it receives the signal from the safety switch 74. Thus, the controller and safety switch 74 prevent operation of the motor 54 when the blender cap 14 is not joined to the container 12. The safety switch 74 may be potted into a cavity of the motor base 50 with thermoset or thermoplastic resin. The safety switch 74 may also be screwed in or otherwise mechanically affixed to the motor base 50. As shown, the safety switch 74 has a push button 76 that is depressed when the blender cap 14 is joined to the container 12 such that the upper edge of the container 12 presses against the seal 68 displacing a portion of the seal 68 upward into the push button 76. When the push button 76 is depressed, a first contact 78 of the safety switch 74 is placed into contact with a second contact 80 of the safety switch 74. When the first and second contacts 78 and 80 make contact with each other, a signal is sent to the controller indicating that the safety switch 74 has been activated to an extent that it is safe to operate the motor 54. While the safety switch 74 is shown in FIG. 11 and described above as including a push button, other types of safety switches may be used with container 12. For example, the safety switch 74 may be an inductive sensor that senses when the blender cap 14 is joined to the container 12. For example, the inductive sensor may sense that the metallic upper edge of the container 12 is positioned in contact with the seal 68. The safety switch 74 may also be an infrared sensor that is configured to sense when the upper edge of the container 12 is positioned in contact with the seal 68.

Figure 12:
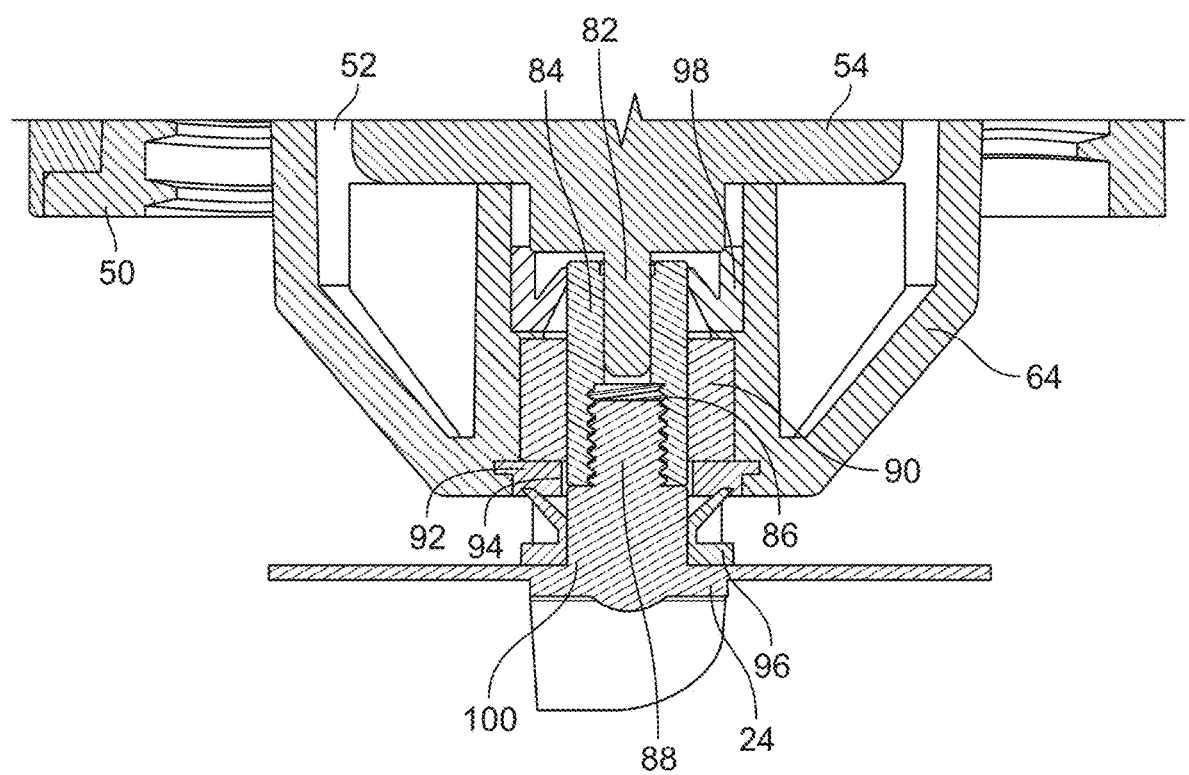
FIG. 12 is a detail view of the area identified as B in FIG. 9.

Referring to FIG. 12, the motor 54 includes a rotatable shaft 82 at its lower end. A shaft extension 84 is press fit on the shaft 82. The shaft extension 84 has an inner threaded surface 86. The blade assembly 24 has a threaded post 88 that engages the inner threaded surface 86 of the shaft extension 84 to join the blade assembly 24 to the shaft 82 of the motor 54. The inner threaded surface 86 and threaded post 88 may have threads that are designed so that the threaded connection does not loosen as the motor shaft 82 rotates the blade assembly 24. For example, the threads may be left-hand threads if the motor shaft 82 rotates the blade assembly 24 in a clockwise direction when viewing the blade assembly 24 as shown in FIG. 8. Instead of a threaded connection between the blade assembly 24 and the shaft extension 84, the blade assembly 24 may be joined to the shaft 82 of the motor in any suitable manner. For example, the shaft extension 84 and blade assembly 24 may have a splined connection, a press fit connection, or any other suitable type of connection. The blade assembly 24 is joined to the motor 54 so that the blades 24*a-f* (shown in FIGS. 5 and 6) are positioned outside of the housing 32 where they can be positioned inside the interior space 22 of the container 12 (FIG. 4) when the blender cap 14 is joined to the container 12.

The housing 32 includes a bushing 90 that defines an opening receiving the shaft extension 84. The bushing 90 may be any suitable type of bushing, including a bronze bushing. The bushing 90 may be overmolded in place within the motor base 50. For example, the motor base 50 may be formed from an injection molded material, such as polypropylene (PP), with the bushing 90 being overmolded into the motor base 50 to hold it in place. The motor base 50 may be formed from any other type of polymeric material other than polypropylene. The bushing 90 allows rotation of the shaft extension 84 while substantially preventing radial movement of the shaft extension 84. Instead of a bushing, bearings may be used to allow rotation of the shaft extension 84 while holding it in place. The housing 32 further includes a washer 92 positioned below the bushing 90 at the lower surface of the motor base 50. The washer 92 defines an opening through which the post 88 of the blade assembly 24 extends. The washer 92 may be stainless steel or any other suitable material. Further, the washer 92 may be overmolded in place within the motor base 50 like the bushing 90.

An axial seal 96 and a radial seal 98 prevent liquid, food products, and other contaminants from entering the cavity 52 of the blender cap 14. The axial seal 96 is positioned between the blade assembly 24 and the washer 92. The axial seal 96 has an opening therethrough that is received by a shaft 100 of the blade assembly 24. The axial seal 96 is compressed axially between the blade assembly 24 and the washer 92 to form a seal between the blade assembly 24 and the washer 92 preventing or substantially preventing the ingress of liquid, food products, and other contaminants through the opening 94 of washer 92. The radial seal 98 is positioned between the motor base 50 and the shaft extension 84 above the bushing 90. The radial seal 98 is compressed radially between the motor base 50 and the shaft extension 84. The radial seal 98 sealingly engages the motor base 50 and shaft extension 84 to prevent liquid, food products, and other contaminants from entering the cavity 52 of the blender cap 14 above the radial seal 98. In the event that the axial seal 96 is damaged or contaminants are otherwise able to bypass the axial seal 96, the radial seal 98 may prevent or substantially prevent those contaminants from entering the cavity 52 of the blender cap 14. The axial seal 96 and radial seal 98 may be formed from silicone or any other suitable material, such as a thermoplastic elastomer, thermoplastic polyurethane, rubber, fluoroelastomer (FKM) or nitrile rubber (Buna-N rubber).

Figure 13:
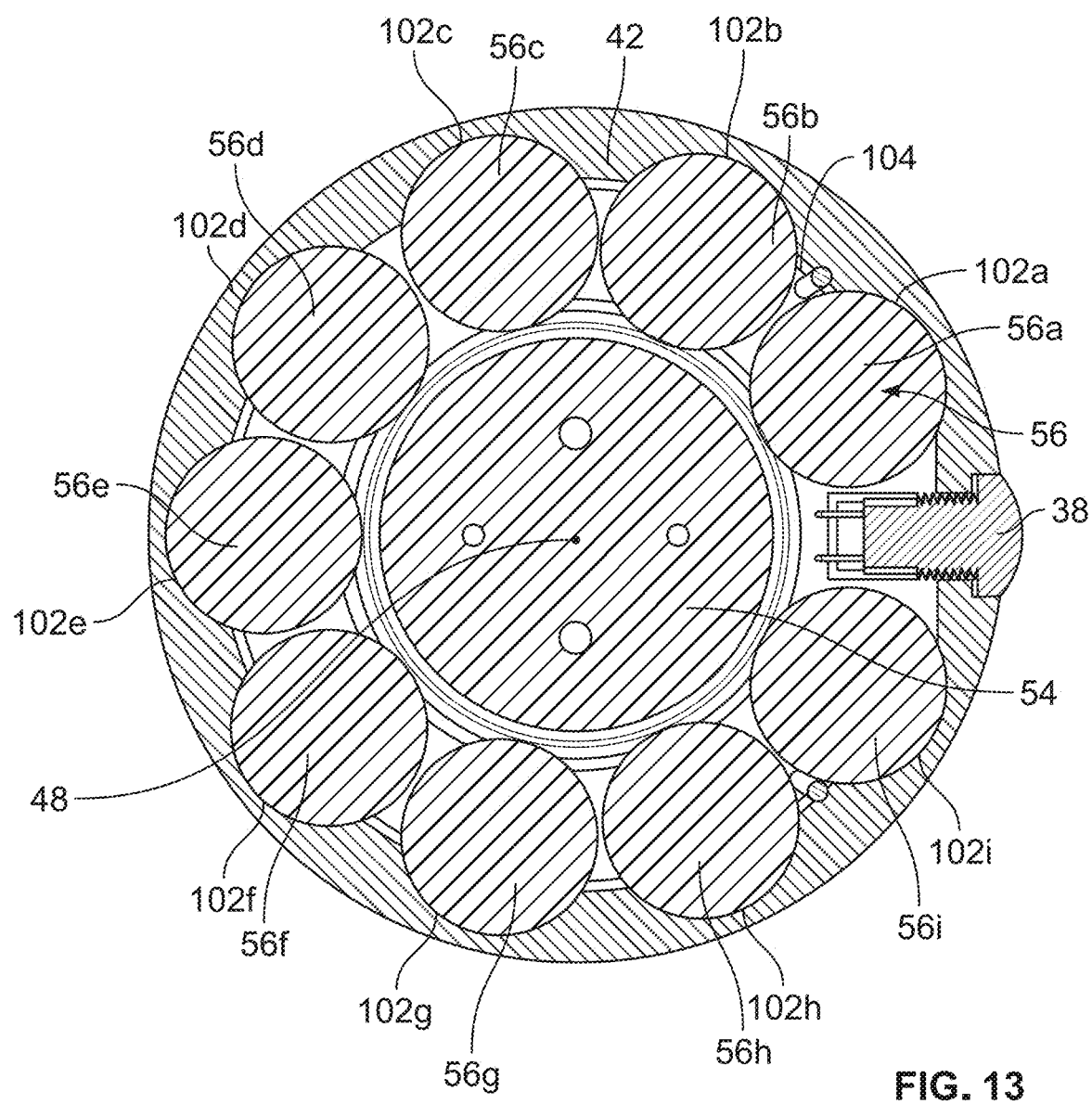
FIG. 13 is a cross-sectional view taken through the line 13-13 in FIG. 6.

As shown in FIG. 13, the battery assembly 56 includes nine batteries 56*a-i* that are arranged circumferentially in an annular manner around the motor 54. Although nine batteries are shown, the battery assembly 56 may include any number of suitable batteries. Each of the batteries 56*a-i* is generally cylindrical and oriented so that a longitudinal axis of the battery is aligned with the central axis 48 of the blender cap 14. The batteries 56*a-i* are radially spaced equidistant from the central axis 48 of the blender cap 14. The side wall 42 of the housing 32 includes nine receptacles 102*a-i* each receiving one of the batteries 56*a-i*. Each of the receptacles 102*a-i* is a groove or channel formed in an inner surface of the side wall 42 with the groove or channel having a curvature that generally matches the cylindrical curvature of the battery 56*a-i* received therein. Ribs, one of which is identified as 104, are positioned between adjacent receptacles 102*a-i*. The receptacles 102*a-i* are sized and configured to radially restrain the batteries 56*a-i* in position within the cavity 52 of housing 32 while positioning the batteries 56*a-i* close to each other and the motor 54. This close positioning minimizes the overall size of the blender cap 14 while providing the motor 54 with a suitable amount of power to blend food products with the blade assembly 24. The batteries 56*a-i* are closely spaced to each other and extend in an annular manner around substantially the entire outer circumference of the motor 54. There is a small gap between the batteries 56*a* and 56*i* allowing space for the switch 38 to be positioned between them. The battery assembly 56 may be configured in other ways that also extend in an annular manner around substantially the entire outer circumference of the motor 54. For example, the battery assembly 56 may be configured as shown in FIGS. 22A-D and described below. Extending or positioned around substantially the entire outer circumference of the motor 54 means that the battery assembly 56 includes one or more batteries that are positioned radially outward from the motor 54 and extend annularly around between approximately 180 degrees to 360 degrees of the circumference of the motor 54, and when more than one battery is used in the battery assembly 56, the batteries may be circumferentially spaced apart from each other. The side wall 42 may be formed from extruded aluminum or any other suitable material, such as injection molded plastic. The side wall 42 may act as a heat sink to transfer heat away from the batteries 56*a-i* and motor 54 when in use to increase the life span of those components and their efficiency.

Figure 14:
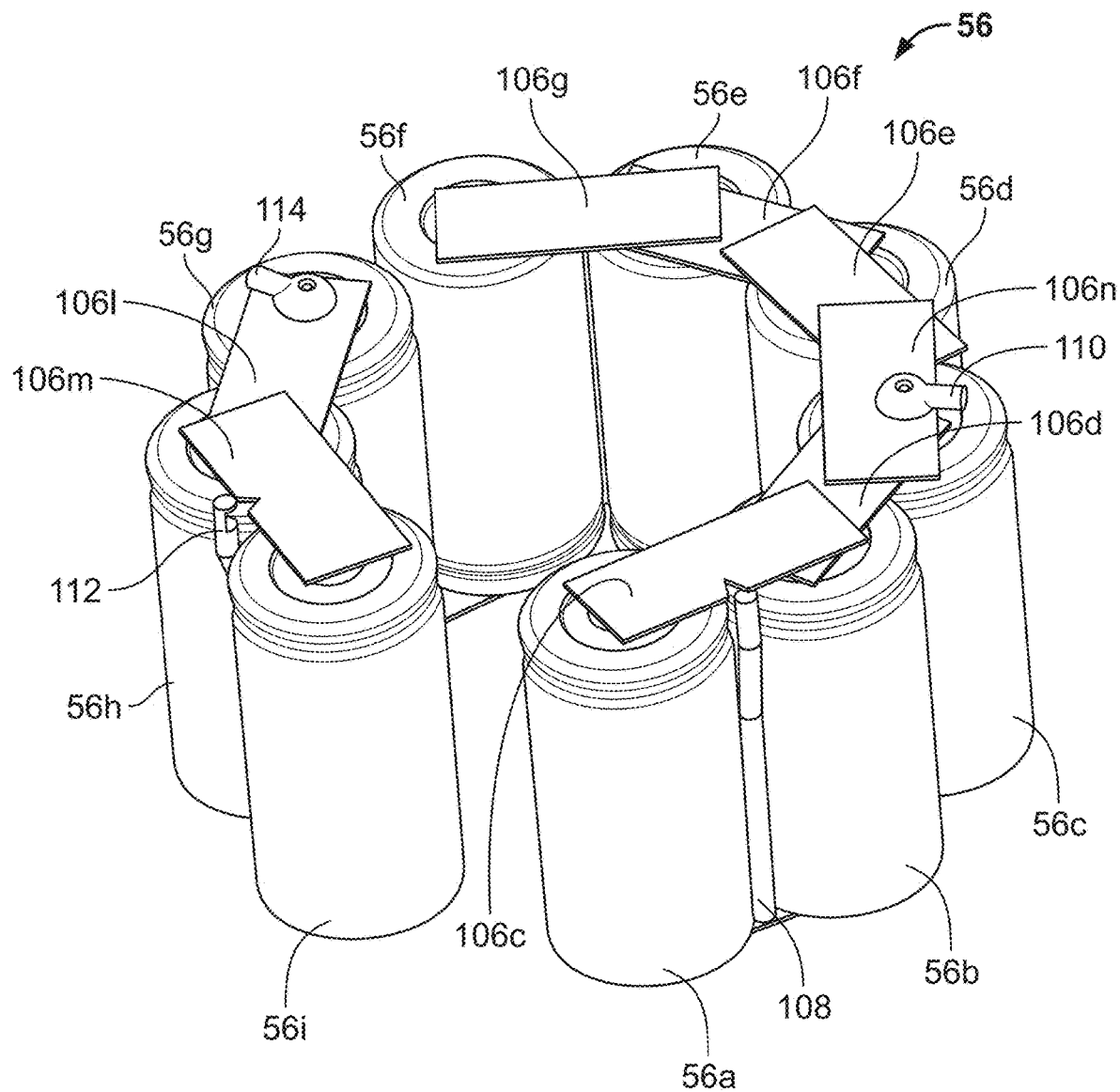
FIG. 14 is a perspective view of a battery assembly of the blender cap shown in FIG. 5.
Figure 15:
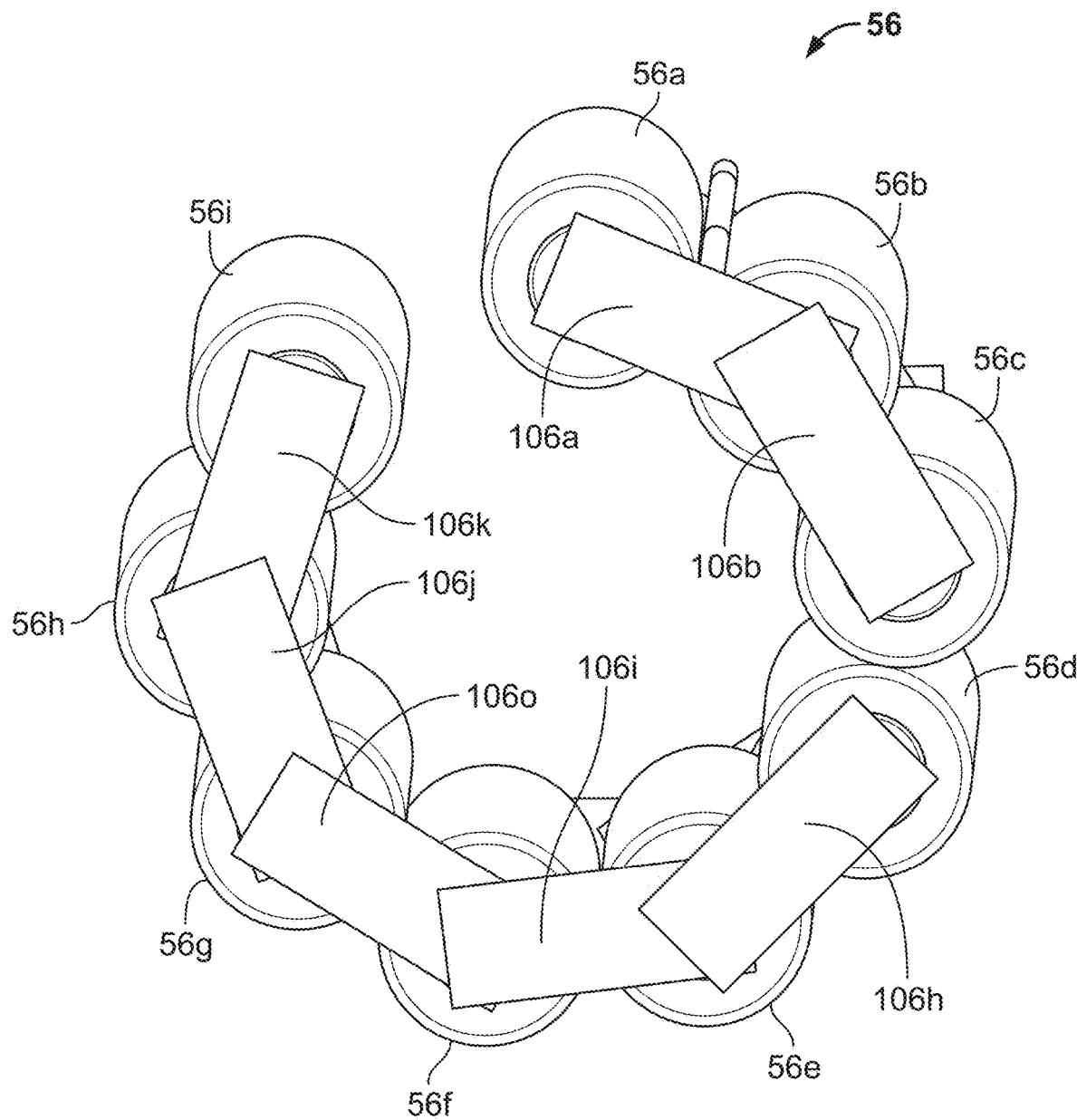
FIG. 15 is a bottom perspective view of the battery assembly shown in FIG. 14.

FIGS. 14 and 15 show the battery assembly 56 prior to its placement in the housing 32. The batteries 56*a-i* are electrically connected in three groupings in a 3s3p orientation as described below. Batteries 56*a-c* form a first group, batteries 56*d-f* form a second group, and batteries 56*g-i* form a third group. The batteries 56*a-c* and 56*g-i* are oriented in the same direction with their positive terminals facing upward when viewed as shown in FIG. 14 and their negative terminals downward. The batteries 56*d-f* are oriented in a reverse direction with their negative terminals facing upward when viewed as shown in FIG. 14 and their positive terminals downward. The first group of batteries 56*a-c* are electrically connected together in parallel to each other. As shown in FIG. 15, two strips 106*a-b* of conductive material electrically connect negative terminals of the batteries 56*a-c*, and as shown in FIG. 14, two strips 106*c-d* of conductive material electrically connect positive terminals of the batteries 56*a-c*. The second group of batteries 56*d-f* are also electrically connected together in parallel to each other. As shown in FIG. 14, three strips 106*e-g* of conductive material electrically connect negative terminals of the batteries 56*d-f*, and as shown in FIG. 14, two strips 106*h-i* of conductive material electrically connect positive terminals of the batteries 56*d-f*. Further, the third group of batteries 56*g-i* are electrically connected together in parallel to each other. As shown in FIG. 15, two strips 106*j-k* of conductive material electrically connect negative terminals of the batteries 56*g-i*, and as shown in FIG. 14, two strips 106*l-m* of conductive material electrically connect positive terminals of the batteries 56*g-i*. The first group of batteries 56*a-c* is electrically connected in series to the second group of batteries 56*d-f* with a strip 106*n* (FIG. 14) of conductive material electrically connecting the positive terminals of batteries 56*a-c* to the negative terminals of batteries 56*d-f*. Further, the second group of batteries 56*d-f* is electrically connected in series to the third group of batteries 56*g-i* with a strip 106*o* (FIG. 15) of conductive material electrically connecting the positive terminals of batteries 56*d-f* with the negative terminals of batteries 56*g-i*. A first lead 108 is joined to the negative terminals of the first group of batteries 56*a-c*. A second lead 110 is joined to the positive terminals of the first group of batteries 56*a-c* and negative terminals of the second group of batteries 56*d-f*. A third lead 112 is joined to the positive terminals of the second group of batteries 56*d-f* and the negative terminals of the third group of batteries 56*g-i*. A fourth lead 114 is joined to the positive terminals of the third group of batteries 56*g-i*.

The batteries 56*a-i* may be any type of suitable batteries. For example, they may be cylindrical lithium ion batteries. In one exemplary embodiment, the batteries 56*a-i* are 18350 lithium ion batteries or 18650 lithium ion batteries. The batteries 56*a-i* may also be nickel cadmium batteries or any other type of rechargeable chemistry. Instead of being cylindrical as shown, the batteries 56*a-i* may be pouch cells or prismatic. The battery assembly 56 may include any number of batteries other than nine. For example, the battery assembly 56 may include eight batteries connected in a 2s4p configuration, three batteries connected in a 3s1p configuration, six batteries connected in a 2s3p configuration, two batteries connected in a 2s1p configuration, four batteries connected in a 2s2p configuration, or any other number of batteries connected in any other suitable configuration.

Figure 16:
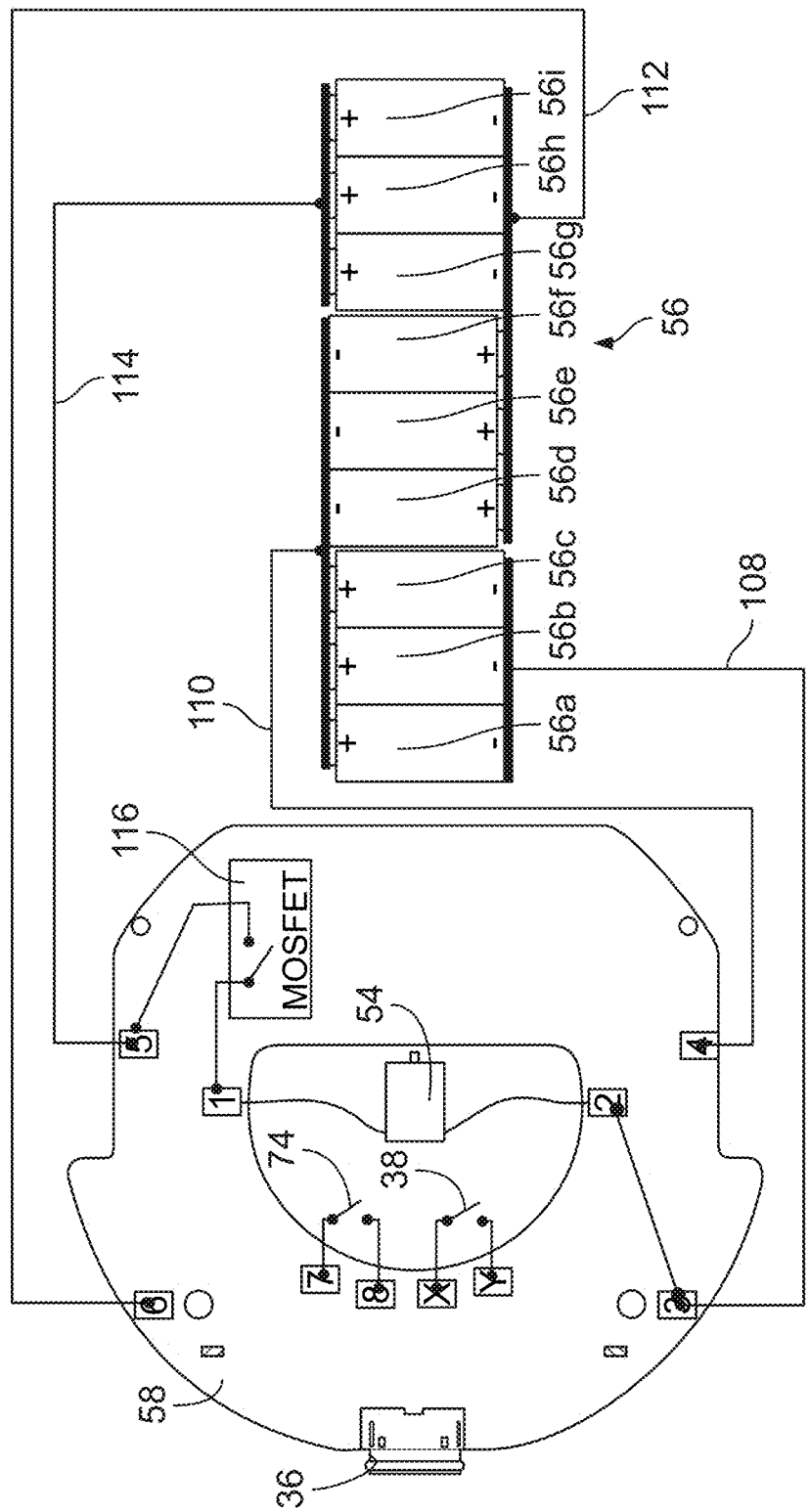
FIG. 16 is a schematic view of a printed circuit board and battery assembly of the blender cap shown in FIG. 5.

As shown in FIG. 16, the battery assembly 56 is electrically connected to the printed circuit board 58. The printed circuit board 58 is also electrically connected to the charging port 36 and the motor 54. The printed circuit board 58 has a battery management system for transmitting power from the charging port 36 to the battery assembly 56 as described in more detail below. A MOSFET 116 on the printed circuit board 58 is electrically connected to the motor 54 and the battery assembly 56. The MOSFET 116 is operable to transmit power from the battery assembly 56 to the motor 54 when the switch 38 is activated, the safety switch 74 is activated, and the batteries 56*a-i* are at a sufficient voltage level to operate the motor 54. The leads 108, 110, 112, and 114 of battery assembly 56 may each be electrically connected to the printed circuit board 58 for charging the battery assembly 56 with the battery management system. The lead 108 is electrically connected to the negative terminal of the motor 54, and the lead 114 is connected to a source terminal of the MOSFET 116 with the drain terminal of the MOSFET connected to the positive terminal of the motor 54. The gate terminal of the MOSFET (not shown) may be connected to a controller that sends a signal to the gate terminal when the switch 38 is activated, the safety switch 74 is activated, and the batteries 56*a-i* are at or above a predetermined voltage level. A voltage difference between the leads 108 and 110 may be 4.2V, for example, a voltage difference between the leads 108 and 112 may be 8.4V, for example, and a voltage difference between the leads 108 and 114 may be 12.6V, for example, when the batteries 56*a-i* are fully charged. The MOSFET 116 may transmit electric power to the motor 54 at 12.6V and 60 A, for example. Although the MOSFET 116 is shown as being electrically connected between the battery assembly 56 and motor 54, the MOSFET 116 may be directly connected to the battery management system of the printed circuit board 58 and indirectly connected to the battery assembly 56 through the battery management system. As a substitute for the MOSFET 116, the printed circuit board 58 may include a transistor or other type of switch. Further, the battery management system of the printed circuit board 58 may be used to transmit power from the battery assembly 56 to the motor 54 instead of using MOSFET 116.

Figure 17:
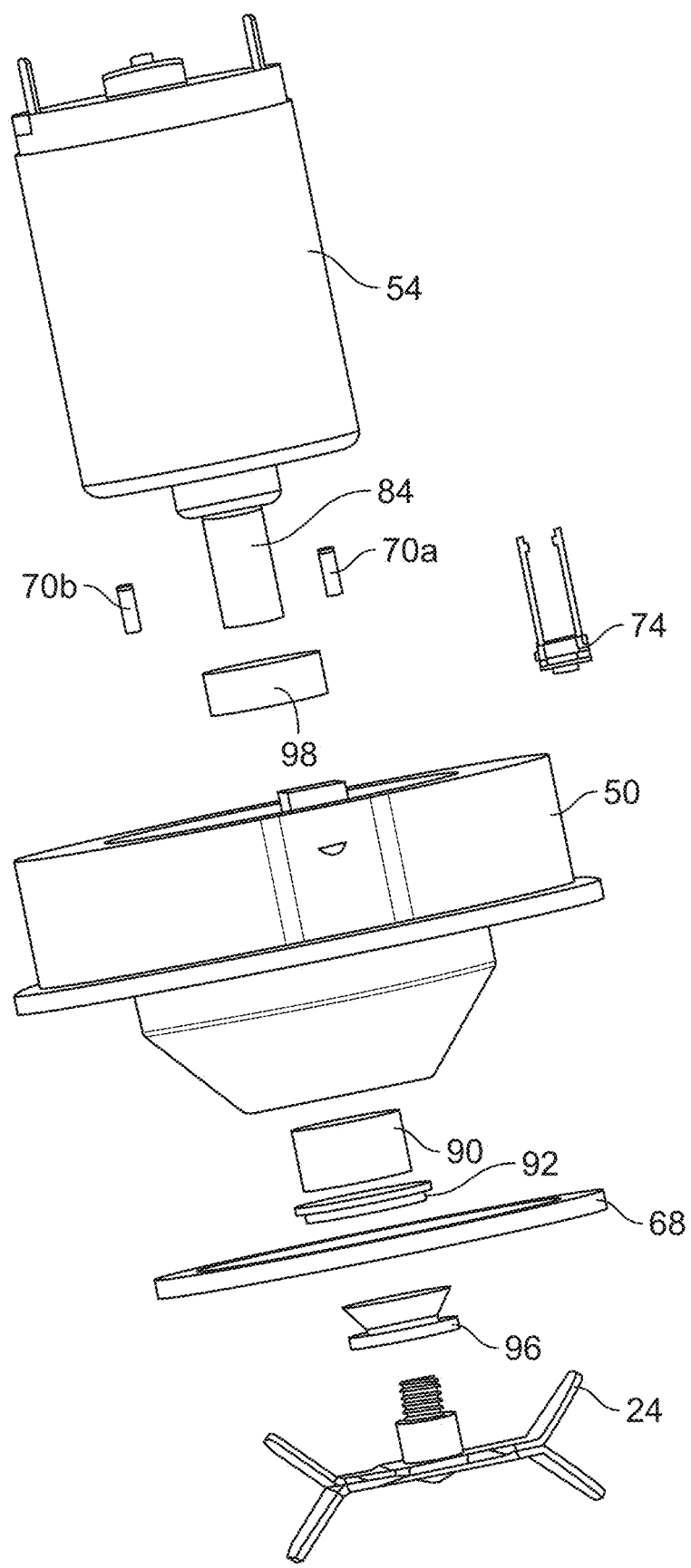
FIG. 17 is an exploded view of a lower portion of the housing of the blender cap shown in FIG. 5.

Assembly of the blender cap 14 is described below with reference to FIGS. 17-19. Referring to FIG. 17, the motor 54 may first be connected to the motor base 50 with pins 70*a-b* as described above. The radial seal 98 is positioned between the motor base 50 and shaft extension 84 of the motor 54. The bushing 90 and washer 92 are overmolded into the motor base 50 when the motor base 50 is formed. The safety switch 74 is connected to the motor base 50 as described above. The seal 68 is press fit and adhered to the motor base 50. The axial seal 96 is positioned on the blade assembly 24, and the blade assembly 24 is screwed into the shaft extension 84 of the motor 54.

Figure 18:
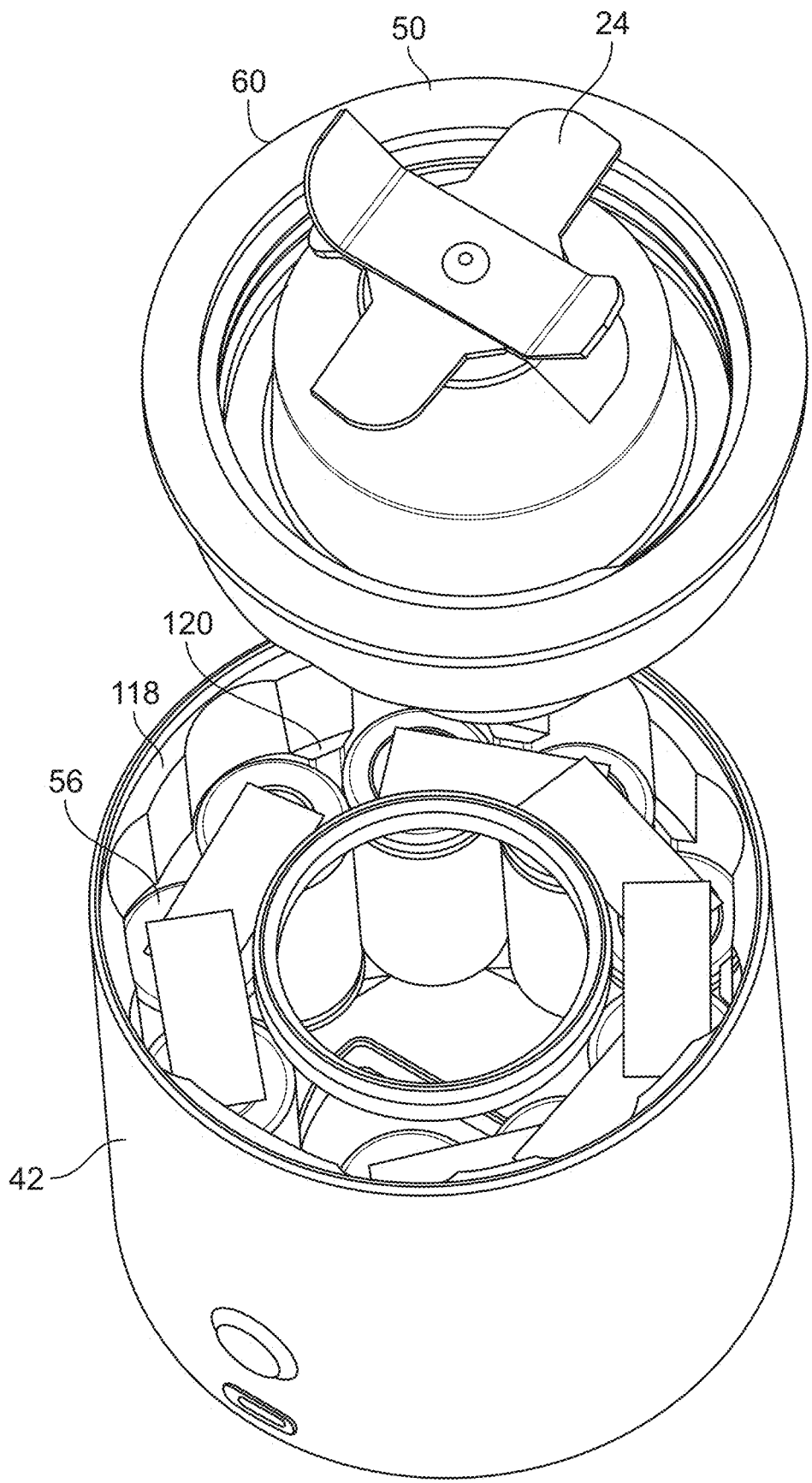
FIG. 18 is a partial exploded view of the blender cap shown in FIG. 5 showing blades and a lower portion of the housing separated from an upper portion of the housing.

As shown in FIG. 18, the assembled motor base 50 may then be inserted into the opening at the bottom of the side wall 42 of the housing 32. The motor base 50 may be press fit into the side wall 42 and adhered to portions of the side wall 42. When press fit into the side wall 42, the flange 60 of the motor base 50 engages a first shoulder 118 of the side wall 42, and the upper wall 62 (FIG. 9) of the motor base 50 engages a second shoulder 120 of the side wall 42 to position the motor base 50 with respect to the side wall 42. The first and second shoulders 118 and 120 of the side wall 42 each include a plurality of shoulders positioned on the ribs 104 (FIG. 13) of the side wall 42. Although FIG. 18 shows the battery assembly 56 already positioned in the blender cap 14, the battery assembly 56 may be inserted into the blender cap 14 after the motor base 50.

Figure 19:
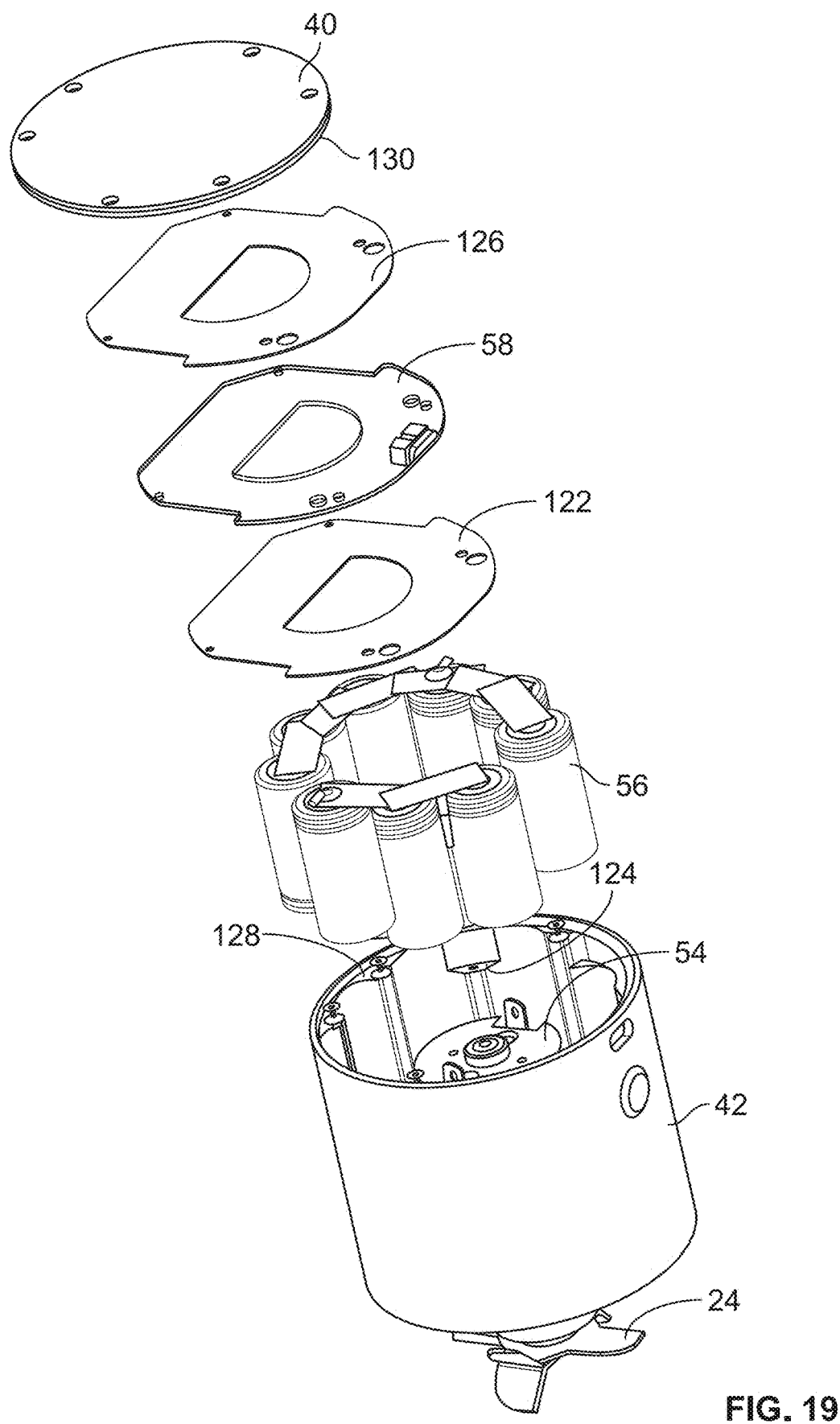
FIG. 19 is a partial exploded view of the blender cap shown in FIG. 5 showing the battery assembly and printed circuit board separated from the housing.

Referring to FIG. 19, after the motor base 50 is joined to the side wall 42, the battery assembly 56 may be inserted into the receptacles 102*a-i* of the side wall 42 around the motor 54 as described in more detail above. The battery assembly 56 may rest on the upper wall 62 of the motor base 50 when inserted into the receptacles 102*a-i*. A protective sheet 122 is then placed above the battery assembly 56. The protective sheet 122 may rest on a third shoulder 124 of the side wall 42. The printed circuit board 58 is placed on top of the protective sheet 122. Wiring connections may be made between the printed circuit board 58 and the battery assembly 56, motor 54, safety switch 74, and switch 38. Another protective sheet 126 is placed on top of the printed circuit board 58. The lid 40 is then positioned on top of the protective sheet 126 and may be supported by a fourth shoulder 128 of the side wall 42. Fasteners 44, shown in FIG. 5, join the lid 40 to the side wall 42. An o-ring seal 130 extends around the lid 40 to seal the connection between the lid 40 and side wall 42.

Figure 20:
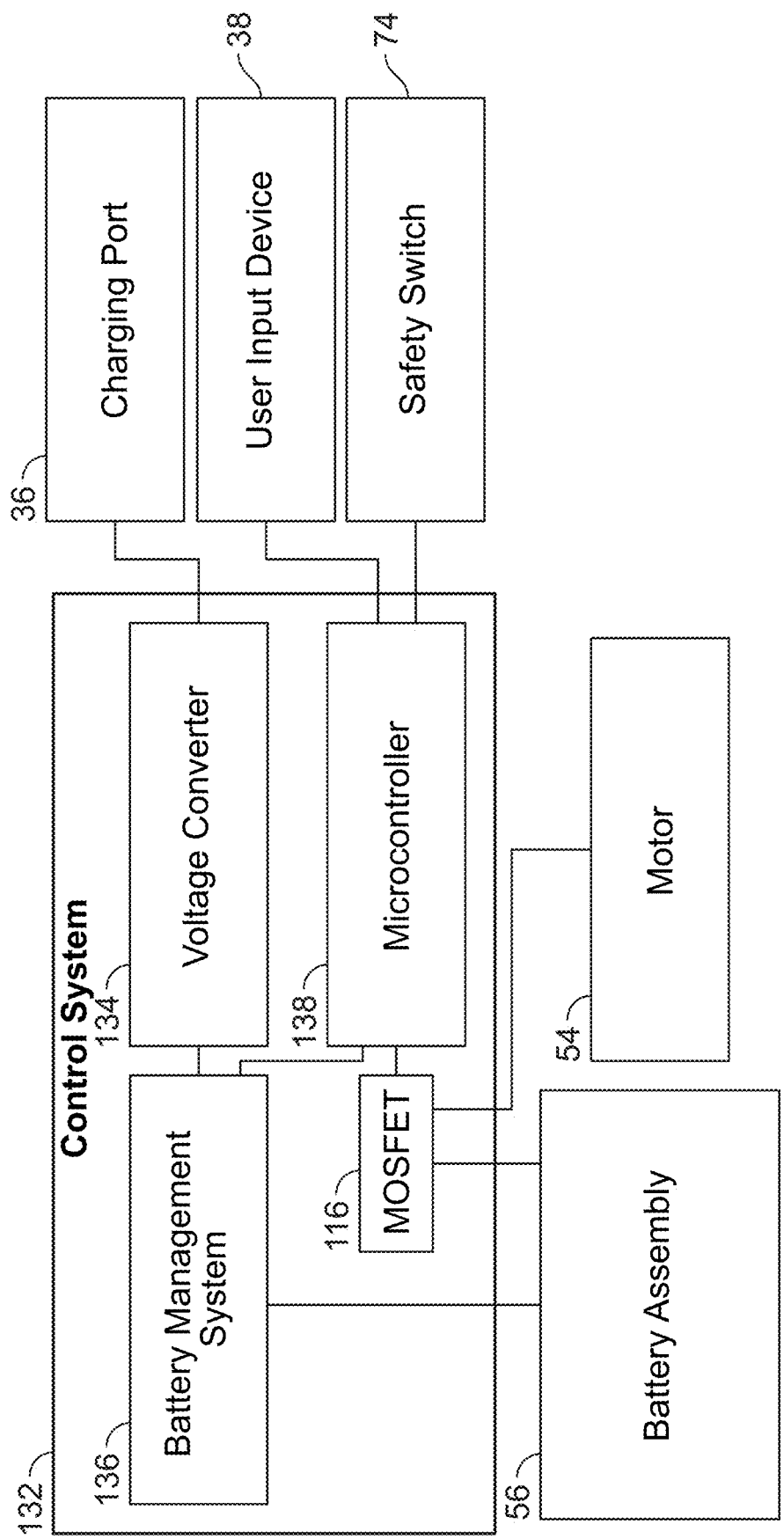
FIG. 20 is a block diagram of a control system of the blender cap shown in FIG. 5.

FIG. 20 shows a schematic layout of a control system 132 of the blender cap 14. The control system 132 may include at least the following components connected to the printed circuit board 58: a voltage converter 134 that is connected between the charging port 36 and the battery management system 136, the battery management system 136, the MOSFET 116, and a microcontroller 138. The voltage converter 134 may convert an electrical signal from the charging port 36 to a higher voltage that is input to the battery management system 136 for charging the battery assembly 56. For example, the charging port 36 may receive a 5V, 1-3 A electrical signal from an external device. The voltage converter 134 may convert this electrical signal to 12.6V, 1 A for charging the battery assembly 56. The voltage converter 134 may convert the incoming electrical signal to any voltage and amperage necessary for effectively charging the battery assembly 56. The battery management system 136 may be a conventional battery management system that monitors the condition of the batteries and the incoming charging signal from the voltage converter 134 to safely and effectively charge the battery assembly 56. The battery management system 136 may include cell balancing and cell protection to accomplish this function. The blender cap 14 may further include a separate printed circuit board in addition to printed circuit board 58 that includes battery management system 136. The microcontroller 138 receives signals from the switch 38, safety switch 74, and battery management system 136 and is programmed to operate the blender cap 14 in connection with these signals, as described in more detail below with reference to FIGS. 21A-C. The microcontroller 138 may be any logic board or integrated circuitry for accomplishing the functions described herein. The microcontroller 138 may be connected to other user input devices instead of, or in lieu of switch 38. For example, the microcontroller 138 may be connected to a touchscreen that is configured to receive inputs from a user for operating the blender cap 14 or a wireless transceiver that is configured to receive signals corresponding to inputs from a user for operating the blender cap 14. Although the MOSFET 116 is shown as being electrically connected between the battery assembly 56 and motor 54, the MOSFET 116 may be directly connected to the battery management system 136 and indirectly connected to the battery assembly 56 through the battery management system 136. Further, as described above, a transistor or other type of switch may be used instead of the MOSFET 116.

Figure 21A:
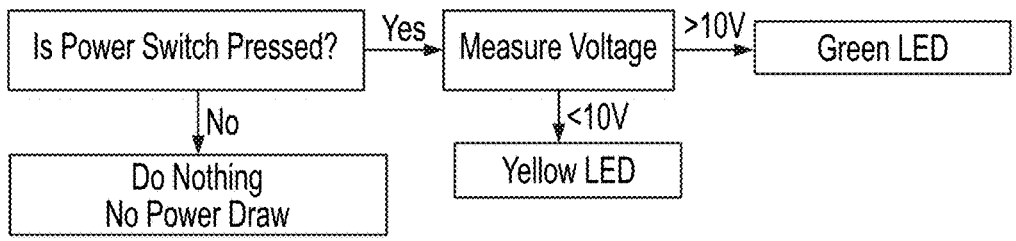
FIGS. 21A-C are flow charts showing modes of operation of the blender cap shown in FIG. 5
Figure 21B:
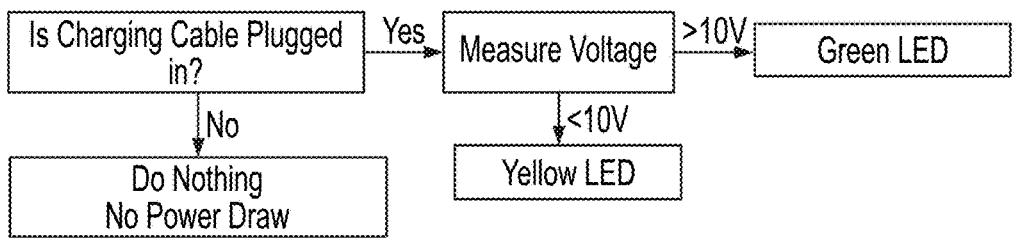
Figure 21C:
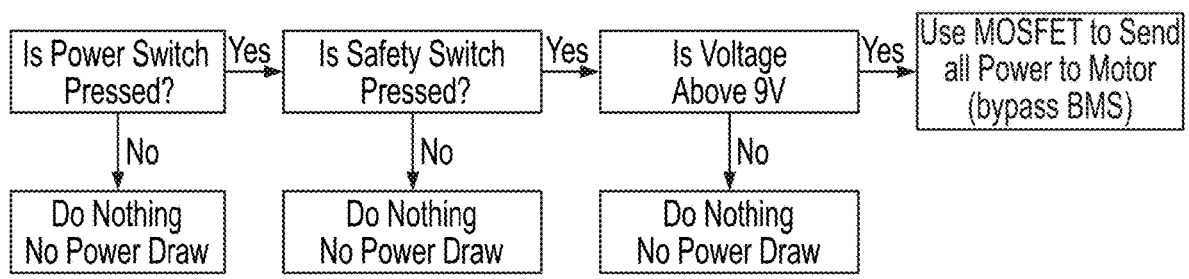

FIGS. 21A-C are flow charts showing exemplary modes of operation of the blender cap 14. For example, as shown in FIG. 21A, when the switch 38 is activated, the microcontroller 138 may receive a measured voltage of the battery assembly 56 from the battery management system 136 and compare the battery assembly 56 voltage to a predetermined voltage level, for example 10V. If the voltage of the battery assembly 56 is greater than or equal to 10V, the microcontroller 138 may cause a green LED on the printed circuit board 58 to activate. The green LED may be visible through one of the plugs 46a-b shown in FIG. 7. If the voltage of the battery assembly 56 is less than 10V, the microcontroller 138 may cause a yellow LED on the printed circuit board 58 to activate. The yellow LED may be visible through one of the plugs 46a-b shown in FIG. 7. The process shown in FIG. 21A may take place when the blender cap 14 is not joined to a container 12 allowing a user to check whether the battery assembly 56 needs to be recharged.

FIG. 21B is a flow chart of a process for recharging the battery assembly 56. If a charging source, e.g., a micro USB cable, is plugged in to the charging port 36, the microcontroller 138 may receive a measured voltage of the battery assembly 56 from the battery management system 136 and compare the battery assembly 56 voltage to a predetermined voltage level, for example 10V. If the voltage of the battery assembly 56 is greater than or equal to 10V, the microcontroller 138 may cause a green LED on the printed circuit board 58 to activate. The green LED may be visible through one of the plugs 46a-b shown in FIG. 7. If the voltage of the battery assembly 56 is less than 10V, the microcontroller 138 may cause a yellow LED on the printed circuit board 58 to activate. The yellow LED may be visible through one of the plugs 46a-b shown in FIG. 7. The process shown in FIG. 21B allows a user to determine when the battery assembly 56 is charged to a sufficient level for operating the blender cap 14.

FIG. 21C is a flow chart of a process for operating the blender cap 14 when the blender cap 14 is joined to a container 12. When the switch 38 is pressed, the microcontroller 138 first determines whether the safety switch 74 is activated. If the safety switch 74 is not activated, the microcontroller 138 may perform the process shown in FIG. 21A without operating the motor 54. If the safety switch 74 is activated, the microcontroller 138 may receive a measured voltage of the battery assembly 56 from the battery management system 136 and compare the battery assembly 56 voltage to a predetermined voltage level, for example 9V. If the voltage of the battery assembly 56 is greater than or equal to 9V, the microcontroller 138 may send a signal to the gate terminal of the MOSFET 116 that causes the MOSFET 116 to transmit power from the battery assembly 56 to the motor 54, thereby causing rotation of the motor shaft 82 and blade assembly 24. If the voltage of the battery assembly 56 is less than 9V, indicating a voltage level that is too low to sufficiently activate the motor 54, the microcontroller 138 may not cause operation of the motor 54 and may instead cause a yellow LED on the printed circuit board 58 to activate. The process shown in FIG. 21C may only cause operation of the motor 54 when the switch 38 is continuously pressed, and the other conditions described above are met. The microcontroller 138 may be programmed to operate the blender cap 14 in different modes, however. For example, the microcontroller 138 may be programmed so that when the switch 38 is activated, the motor 54 operates for five seconds at high power and for thirty seconds at low power. The microcontroller 138 may be programmed to operate in any desirable manner.

FIGS. 22A-D show four different battery assemblies that may be substituted for the battery assembly 56 and used with blender cap 14. FIGS. 22A-D are cross-sectional views similar to the view in FIG. 13 described above. For example, FIG. 22A shows a blender cap 200 having eight cylindrical batteries 202a-h arranged around a motor 204. The batteries 202a-h are arranged circumferentially in an annular manner around the motor 204. The batteries 202a-h are positioned around substantially the entire circumference of the motor 204. The batteries 202a-h are positioned radially outward from the motor 204. The batteries 202a-h are oriented so that a longitudinal axis of each battery is aligned with a central axis of the blender cap. Receptacles (not shown) may be formed in a side wall 206 to hold the batteries 202a-h in a similar manner as described above with respect to the receptacles 102a-i shown in FIG. 13. The batteries 202a-h may be electrically connected in any desired configuration, for example, a 2s4p configuration.

FIG. 22B shows a cross-sectional view of a blender cap 300 having a battery assembly with four prismatic batteries 302a-d arranged around a motor 304. The batteries 302a-d are arranged circumferentially in an annular manner around the motor 304. The batteries 302a-d are positioned around substantially the entire circumference of the motor 304. The batteries 302a-d are positioned radially outward from the motor 304. Receptacles (not shown) may be formed in a side wall 306 to hold the batteries 302a-d in a similar manner as described above with respect to the receptacles 102a-i shown in FIG. 13. The batteries 302a-d may be electrically connected in any desired configuration, for example, a 2s2p configuration.

FIG. 22C shows a cross-sectional view of a blender cap 400 having a battery assembly with six pouch batteries 402a-f arranged around a motor 404. The batteries 402a-f are arranged circumferentially in an annular manner around the motor 404. The batteries 402a-f are positioned around substantially the entire circumference of the motor 404. The batteries 402a-f are positioned radially outward from the motor 404. Receptacles (not shown) may be formed in a side wall 406 to hold the batteries 402a-f in a similar manner as described above with respect to the receptacles 102a-i shown in FIG. 13. The batteries 402a-f may be electrically connected in any desired configuration, for example, a 2s3p configuration.

FIG. 22D shows a cross-sectional view of a blender cap 500 having a battery assembly with two curved batteries 502a-b arranged around a motor 504. The batteries 502a-b are arranged circumferentially in an annular manner around the motor 504. The batteries 502a-b are positioned around substantially the entire circumference of the motor 504. The batteries 502a-b are positioned radially outward from the motor 504. Receptacles (not shown) may be formed in a side wall 506 to hold the batteries 502a-b in a similar manner as described above with respect to the receptacles 102a-i shown in FIG. 13. The batteries 502a-b may be electrically connected in any desired configuration, for example, a 2s1p configuration.

Figure 23:
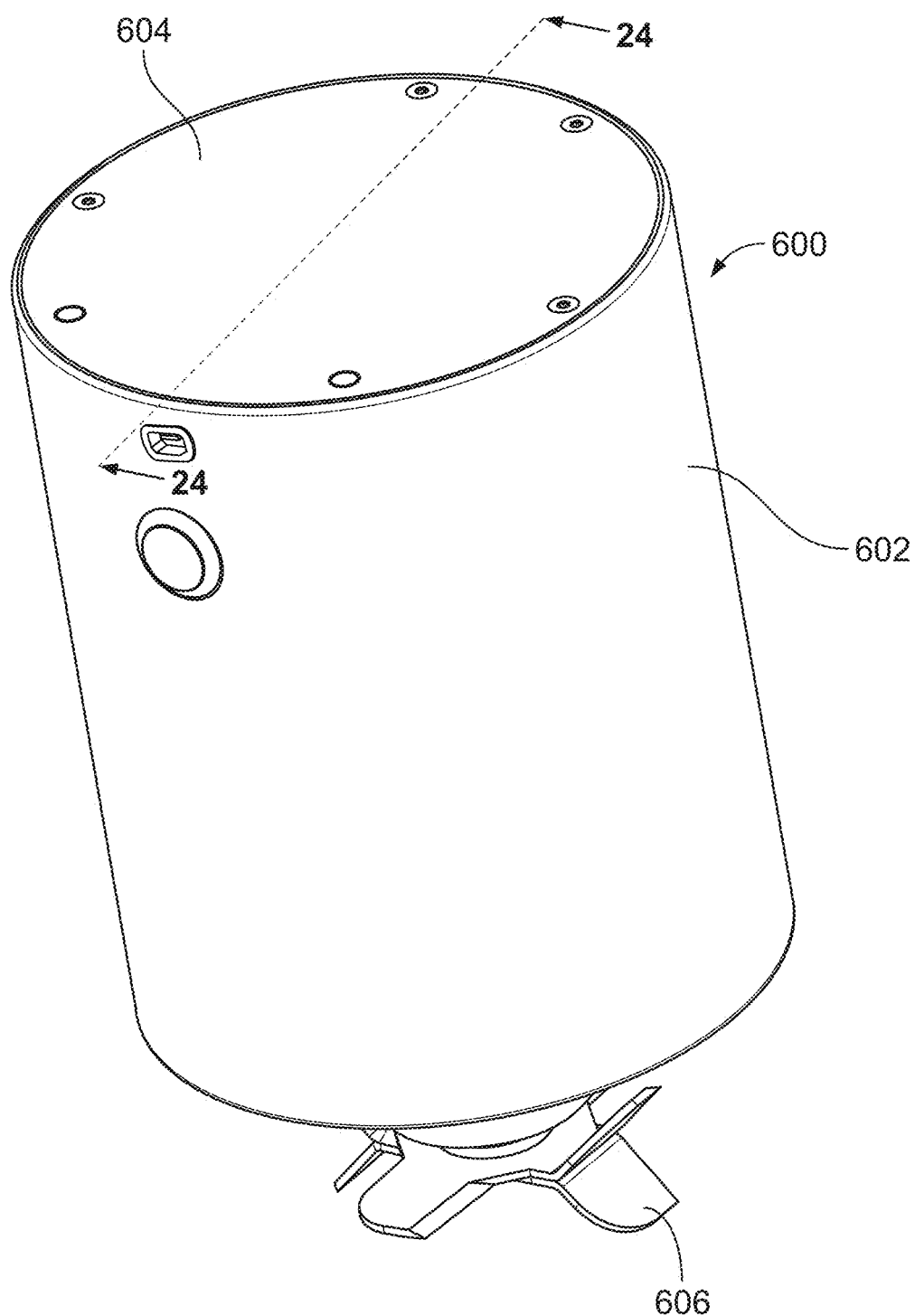
FIG. 23 is a perspective view of an alternative embodiment of blender cap in accordance with the invention described herein.
Figure 24:
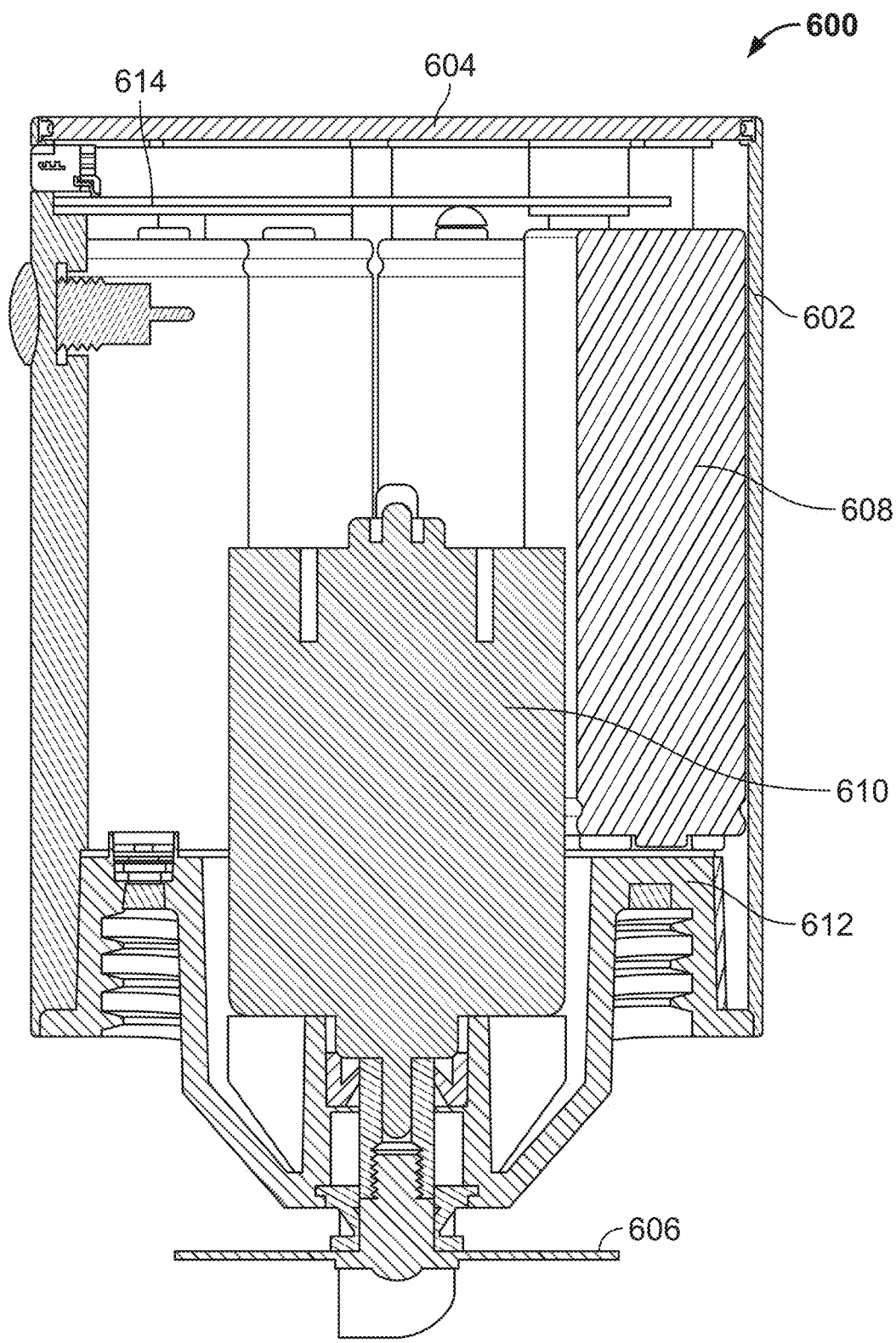
FIG. 24 is a cross-sectional view taken through the line 24-24 of FIG. 23.

Referring now to FIGS. 23 and 24, an alternative embodiment of blender cap in accordance with the invention described herein is identified generally as 600. Blender cap 600 is substantially similar to blender cap 14 described above and may be used with the container 12 in the same manner as described above with respect to blender cap 14. Thus, only the differences between blender cap 600 and blender cap 14 are described in detail herein. Blender cap 600 has a side wall 602 that is longer in a direction aligned with a longitudinal axis of the blender cap 600, i.e., there is a greater distance between the lid 604 and the blade assembly 606 for blender cap 600 than the distance between the lid 40 and blade assembly 24 of the blender cap 14. The increased height of the side wall 602 allows the blender cap 600 to have a battery assembly 608 (FIG. 24) with a larger power capacity than the battery assembly 56 of blender cap 14. The side wall 602 may have a height, or distance from the lid 604 to the opposite end of the side wall 602, of between approximately 90 to 110 mm or approximately 100 mm. The side wall 602 may have a diameter of between approximately 70 to 90 mm or approximately 80 mm. As shown in FIG. 24, blender cap 600 has a battery assembly 608 that is arranged in an annular manner circumferentially around a motor 610 in a similar manner as blender cap 14. The battery assembly 608 may have nine batteries arranged around the motor 610 like blender cap 14. The batteries of the battery assembly 608 are cylindrical like the batteries 56a-i of blender cap 14, but the batteries of the battery assembly 608 are longer than the batteries 56a-i of blender cap 14. Thus, the batteries of the battery assembly 608 extend a longer distance from a motor base 612 of the blender cap 600 to a printed circuit board 614 of the blender cap 600 than the batteries 56a-i of blender cap 14. The batteries of the battery assembly 608 may be 18650 cylindrical lithium ion batteries, whereas the batteries 56a-i may be 18350 cylindrical lithium ion batteries. The motor 610 of blender cap 600 may also have a larger power rating than the motor 54 of blender cap 14. For example, the motor 610 may be a 1.4 hp brushed DC motor.

Figure 25:
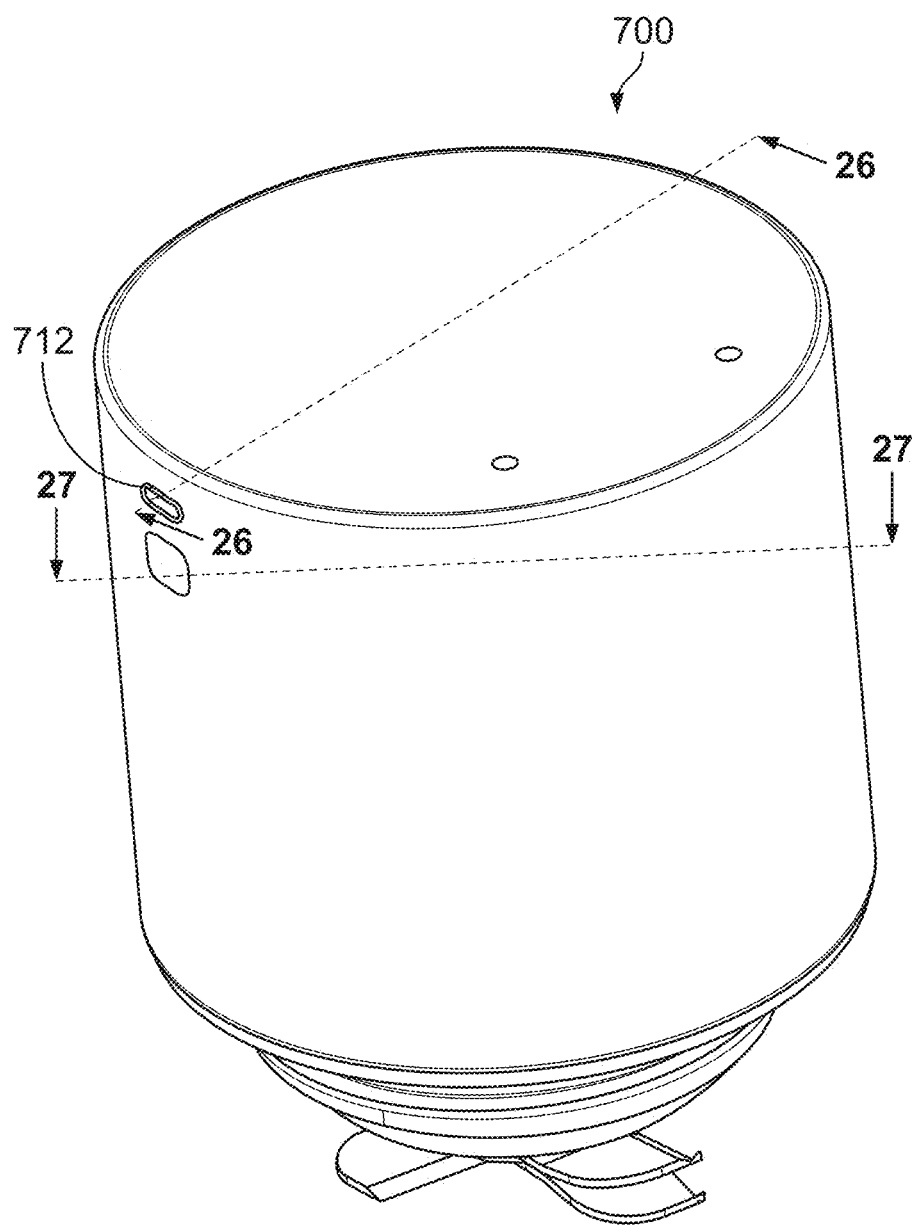
FIG. 25 is a perspective view of another alternative embodiment of blender cap in accordance with the invention described herein.
Figure 26:
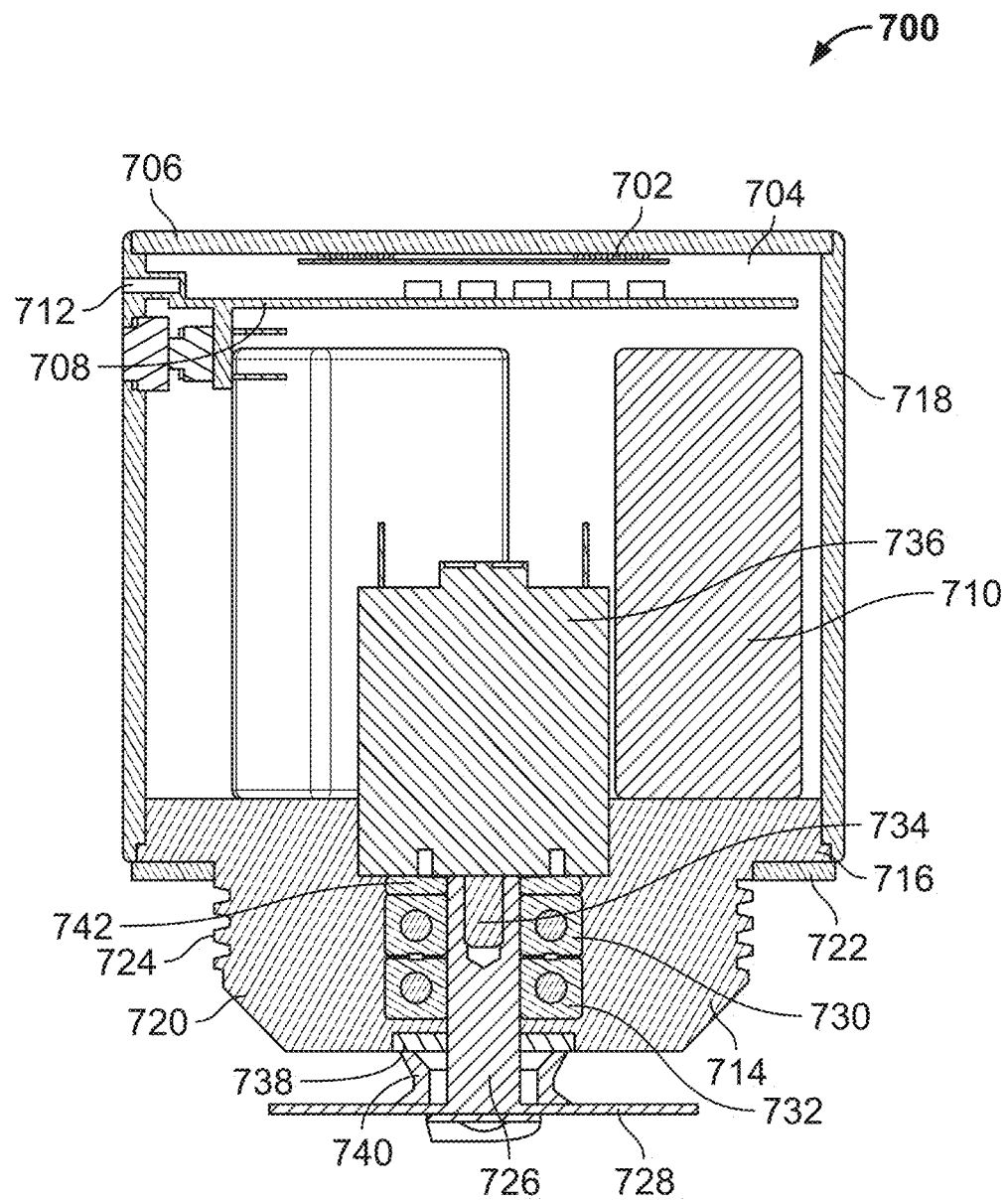
FIG. 26 is a cross-sectional view taken through the line 26-26 in FIG. 25.
Figure 27:
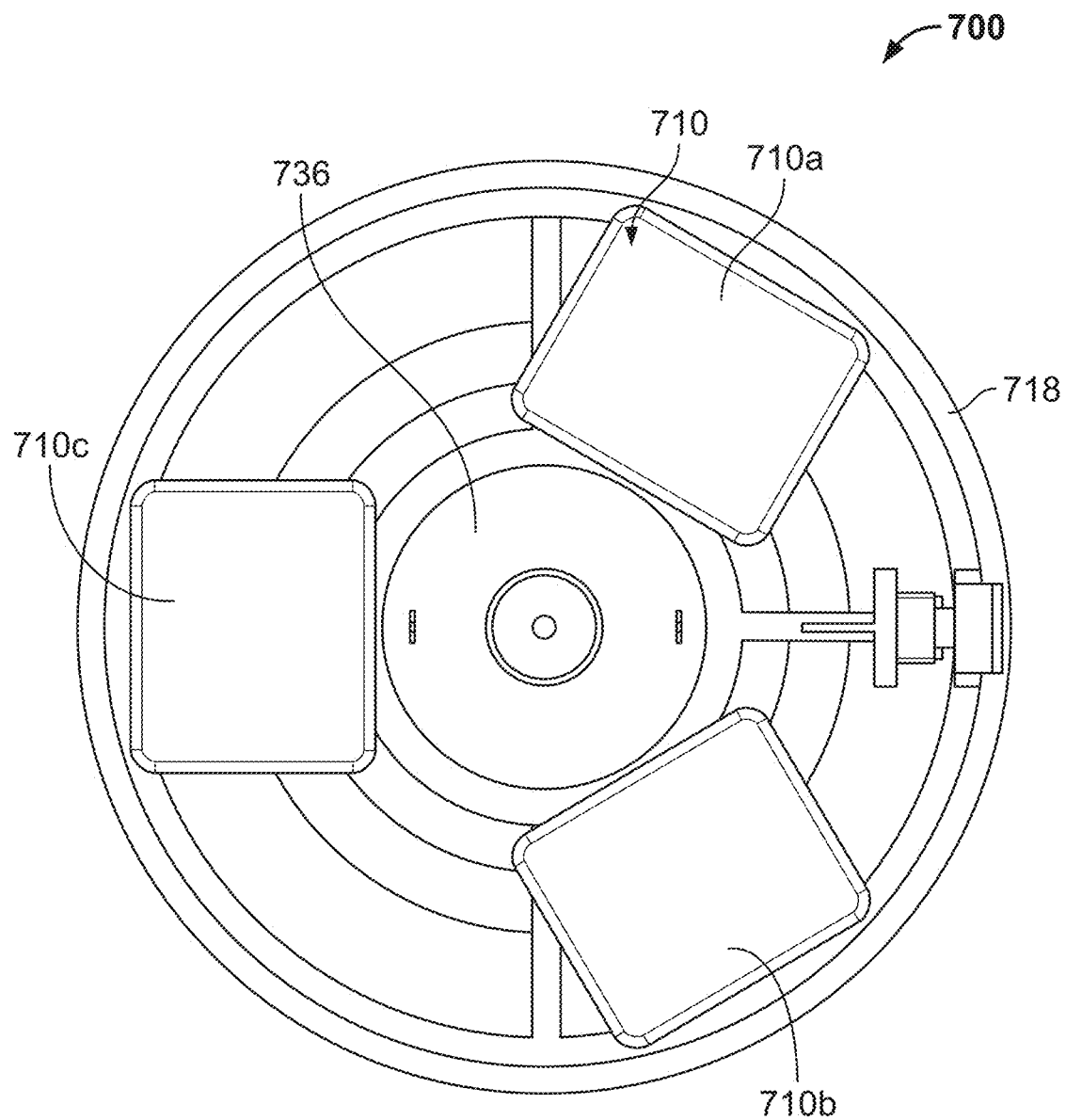
FIG. 27 is a cross-sectional view taken through the line 27-27 in FIG. 25.

FIGS. 25-27 show another alternative embodiment of blender cap 700 in accordance with the invention described herein. Blender cap 700 is substantially similar to blender cap 14 described above and may be used with a container in a similar manner as described above with respect to blender cap 14 and container 12. Thus, only the differences between blender cap 700 and blender cap 14 are described in detail herein.

Referring to FIG. 26, blender cap 700 has a wireless charging coil 702 that is positioned inside of a cavity 704 of the blender cap 700 between a lid 706 and a printed circuit board 708. The wireless charging coil 702 is electrically connected to a battery management system on the printed circuit board 708 to transmit power to a battery assembly 710 of the blender cap 700. The wireless charging coil 702 may be configured to receive an inductive charge from a wireless charging station or pad (not shown). The wireless charging coil 702 may be configured for use with Qi wireless charging stations or pads. To charge the battery assembly 710 of the blender cap 700, the blender cap 700 may be placed in an inverted manner with the lid 706 resting on a wireless charging station or pad. The blender cap 700 also includes a charging port 712, which is shown as a USB type C port. The charging port 712 may be any of the types of charging ports described above for blender cap 14 and may operate to charge the battery assembly 710 in the same manner as described above for blender cap 14. Further, the charging port 712 may be omitted from the blender cap 700 with the blender cap 700 relying on the wireless charging coil 702 for charging the battery assembly 710. The blender cap 14 may further include a wireless charging coil like the wireless charging coil 702 for charging its battery assembly 56.

The motor base 714 of blender cap 700 is configured in a different manner than the motor base 50 of blender cap 14. As shown in FIG. 26, the motor base 714 has an upper wall 716 that is press fit within the side wall 718 and a protrusion 720 extending downward from the upper wall 716 away from the side wall 718. The upper wall 716 may be press fit and adhered to the side wall 718 in a similar manner as described above for blender cap 14. An annular seal 722 is affixed to a lower surface of the upper wall 716. The seal 722 is configured to engage the upper edge of a container for sealing a mouth of the container when the blender cap 700 is joined to the container. The protrusion 720 includes a male threaded surface 724 that may be inserted through the mouth of a container to engage a female threaded surface of the container to join the blender cap 700 to the container. The motor base 50 of blender cap 14 may also be configured to have a male threaded surface for engaging a female threaded surface of a container.

The motor base 714 includes an opening through which a shaft 726 of the blade assembly 728 extends. Two bearings 730 and 732 are positioned in the opening through the motor base 714. The bearings 730 and 732 have aligned openings that receive the shaft 726 of the blade assembly 728 for supporting the shaft 726 and allowing it to rotate. The shaft 726 of the blade assembly 728 is joined to a shaft 734 of the motor 736. The motor 736 may be joined to the motor base 714 with pins in a similar manner as described above with respect to motor 54. The motor base 714 further includes a washer 738 that is overmolded to a lower surface of the protrusion 720. The washer 738 has an opening that is aligned with the openings through bearings 730 and 732 and that receives the shaft 726 of the blade assembly 728.

An axial seal 740 is compressed between the blade assembly 728 and the washer 738 to seal the opening through the washer 738 and prevent or substantially prevent fluid, food products, and other contaminants from entering the blender cap 700 when in use. The axial seal 740 may be substantially similar to the axial seal 96 of blender cap 14 described above. Another annular seal 742 is positioned between the bearing 730 and the motor 736. The annular seal 742 further seals the opening through the motor base 714 to prevent or substantially prevent fluid, food products, and other contaminants from entering the blender cap 700.

As shown in FIG. 27, the battery assembly 710 of blender cap 700 includes three batteries 710*a-c* that are positioned radially outward from the motor 736 and positioned between the motor 736 and side wall 718. The side wall 718 may include receptacles, like the receptacles 102*a-i* described above, to hold the batteries 710*a-c* in place within the blender cap 700. The batteries 710*a-c* may be any of the types of batteries described above for blender cap 14, and blender cap 700 may include more or less than three batteries. The batteries 710*a-c* are arranged in an annular manner around substantially an entire circumference of the motor 736. The motor 736 may be any of the types of motors described above for blender cap 14.

Figure 28:
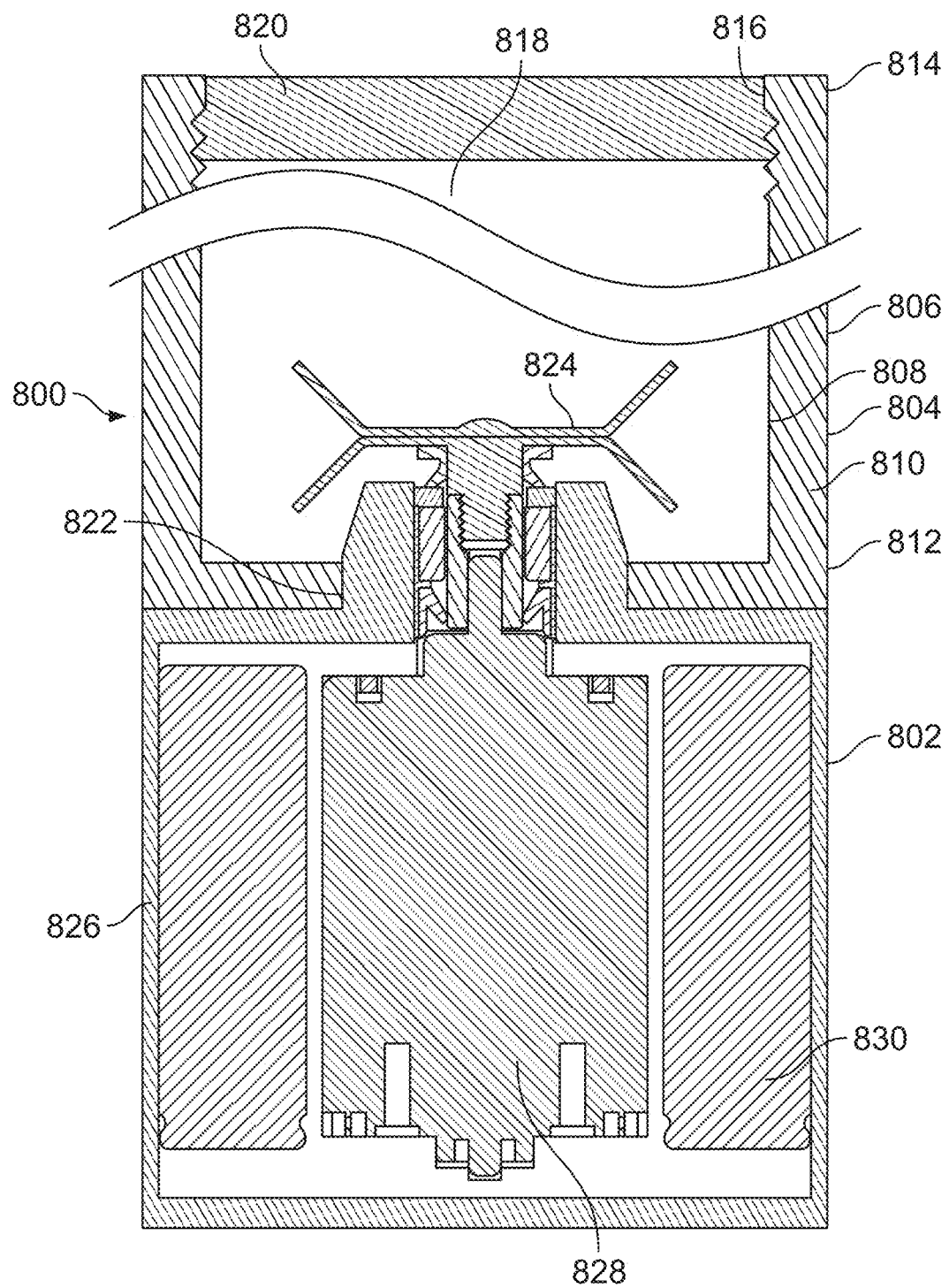
FIG. 28 is a cross-sectional view of an alternative embodiment of portable blender in accordance with the invention described herein.

Referring to FIG. 28, another embodiment of portable blender in accordance with the invention described herein is identified generally as 800. Portable blender 800 is similar to portable blender 10 with the exception that portable blender 10 has a removable blender cap 14 and portable blender 800 has the components of blender cap 14 built in to an assembly 802 that is configured for coupling to the bottom of a container 804. The container 804 has an outer wall 806 spaced from an inner wall 808 to defined an enclosed space 810 that is at least a partial vacuum in the same manner as described above with respect to container 12. The container 804 has a first end 812 that is coupled to the assembly 802 and a second end 814. A mouth 816 of the container 804 is at the second end 814. An interior space 818 of the container 804 is accessible through the mouth 816. A lid or cap 820 is configured to removably engage the second end 814 for covering the mouth 816. The container 804 includes an opening 822 at its first end 812 through which a portion of the assembly 802 and a blade assembly 824 extend so that the blade assembly 824 is positioned in the interior space 818.

The assembly 802 is similar to blender cap 14 except that the assembly 802 is configured for coupling to the first end 812 of the container 804 opposite the mouth 816 of the container 804. The assembly 802 may be removably coupled to the container 804 or permanently affixed to the container 804 during manufacturing. For example, a housing 826 of the assembly 802 may include external male threads that engage female threads of the container 804 surrounding the opening 822. Alternatively, the assembly 802 may be adhered or otherwise affixed to the container 804. In some embodiments, the assembly 802 may be provided separate from the container 804.

The assembly 802 includes substantially the same components as the blender cap 14 described above. Like blender cap 14, the assembly 802 includes a housing 826 with a motor 828 and a battery assembly 830 positioned in the housing 826. The blade assembly 824 may be joined to a shaft of the motor 828 in any of the manners described above for blender cap 14. The assembly 802 may further include a printed circuit board (not shown), user input device (not shown), and charging port (not shown) that are structured and operate in any of the manners described above for blender cap 14. The battery assembly 830 includes a plurality of batteries that are positioned radially outward from the motor 828 and extend circumferentially around the motor 828. The battery assembly 830 may be structured and operate in the same manner as the battery assembly 56 described above or any of the alternative battery assemblies described herein. If the assembly 802 is removable from the container 804, the assembly 802 may further include a safety switch (not shown) that is configured like the safety switch 74 described above for blender cap 14 to prevent operation of the motor 828 when the assembly 802 is not joined to the container 804.

Blender caps 14, 600, and 700 are used in substantially the same manner. In use, a container, like container 12, is first filled with a material desired for blending (e.g., a food product and a liquid). A blender cap 14, 600, or 700 may then be joined to the container in the manner described above so that a safety switch (e.g., safety switch 74) of the blender cap is activated. The container and blender cap 14, 600, or 700 are then inverted so that the blender cap is positioned below the container. A switch (e.g., switch 38) or other user input device of the blender cap is then activated to activate the motor (e.g., motor 54) and rotate the blade assembly (e.g., blade assembly 24) of the blender cap. The switch is released or deactivated after a desired duration of blending of the material. The blender cap 14, 600, or 700 and container may then be inverted so that the blender cap is above the container, and the blender cap may be removed from the container for consumption of the blended material within the container. The blended material within the container 12 may be stored for a long duration of time due to the thermal insulation of the dual-walled, vacuum insulated container. The blender cap 14, 600, or 700 may remain engaged with the container 12 for storage of the blended material therein, or a separate cap may be engaged with the container to cover the mouth of the container. When the battery assembly (e.g., battery assembly 56) of the blender cap 14, 600, or 700 is depleted, it may be recharged in the manner described above.

Portable blender 800 is used in substantially the same manner as described above with respect to blender caps 14, 600, and 700 with the exception that the assembly 802 is joined to the bottom of the container 804 and a separate lid 820 is positioned over the mouth 816 of the container 804 during blending. During consumption of the blended material within the container 804, the assembly 802 remains connected to the container 804. In some embodiments, the assembly 802 may be disconnected from the container 804 for cleaning and storage.

Spatial and functional relationships between elements (for example, between circuit elements) are described using various terms, including "connected," "engaged," "coupled," "adjacent," "next to," "on top of," "above," "below," and "disposed." Unless explicitly described as being "direct," when a relationship between first and second elements is described herein, that relationship can be a direct relationship where no other intervening elements are present between the first and second elements, but can also be an indirect relationship where one or more than one intervening elements are present (either spatially or functionally) between the first and second elements.

This invention is well adapted to attain all ends and objectives set forth herein, together with all other advantages obvious and inherent to the product.

It is affirmatively stated that all matters set forth herein and portrayed in the accompanying drawings are illustrative, inclusive of and not limiting to all possible embodiments which may be made of this invention without departing from the scope thereof.

While specific embodiments have been shown and discussed, various modifications may be made, and the invention is not limited to the specific forms or arrangement of parts and steps described herein, except insofar as such limitations are included in the following claims. Further, it will be understood that certain features and subcombinations are of utility and may be employed without reference to other features and subcombinations. This is contemplated by and is within the scope of the claims.

What is claimed and desired to be secured by Letters Patent is as follows:

1. A portable blender comprising:
   a. a container defining a mouth through which an interior space of the container is accessible;
   b. a housing configured for coupling to the container;
   c. a plurality of batteries positioned at least partially in the housing, wherein the plurality of batteries includes a first group of batteries and a second group of batteries, the first group of batteries electrically connected in parallel to each other, the second group of batteries electrically connected in parallel to each other, and the first group of batteries electrically connected in series to the second group of batteries;
   d. a motor electrically connected to the plurality of batteries, the motor positioned at least partially in the housing;
   e. a blade coupled to the motor, at least a portion of the blade positioned outside of the housing so that at least a portion of the blade is configured to be positioned in the interior space of the container when the housing is coupled to the container; and
   f. a user input device that is operable to cause power to be sent from the plurality of batteries to the motor so that the motor rotates the blade.

2. The portable blender of claim 1, wherein the housing is configured to be removably coupled to the container so that the housing substantially seals the mouth of the container.

3. The portable blender of claim 2, further comprising a safety switch that is configured to sense when the housing is coupled to the container and prevent operation of the motor when the housing is not coupled to the container.

4. The portable blender of claim 3, wherein the housing comprises a seal that is configured to engage the container when the housing is coupled to the container, wherein the seal is positioned between the safety switch and the container when the housing is coupled to the container.

5. The portable blender of claim 1, wherein each of the plurality of batteries is positioned radially outward from the motor, and wherein the plurality of batteries are positioned circumferentially around the motor.

6. The portable blender of claim 5, wherein the plurality of batteries are positioned around substantially the entire circumference of the motor.

7. The portable blender of claim 5, wherein an inner surface of the housing has a plurality of receptacles each receiving one of the plurality of batteries.

8. The portable blender of claim 1, further comprising a charging port that is electrically connected to a battery management system, the battery management system electrically connected to the plurality of batteries and configured to transmit power from the charging port to the plurality of batteries.

9. The portable blender of claim 8, further comprising a control system electrically connected to the motor, the control system further electrically connected to at least one of the battery management system or the plurality of batteries, and wherein the control system is operable to transmit power from the plurality of batteries to the motor when the user input device is activated.

10. The portable blender of claim 9, wherein the control system comprises a MOSFET or transistor that is operable to transmit power from the plurality of batteries to the motor when the user input device is activated.

11. The portable blender of claim 1, wherein the housing comprises a side wall formed from extruded aluminum.

12. The portable blender of claim 1, wherein the housing is configured to be coupled to a first end of the container, and wherein the mouth is at a second end of the container.

13. The portable blender of claim 1, wherein the container comprises an outer wall and an inner wall that is spaced from the outer wall to define an enclosed space positioned between the outer wall and the inner wall, wherein the enclosed space is at least a partial vacuum.

14. An assembly for a portable blender comprising:
   a. a housing configured for coupling to a container;
   b. a motor positioned at least partially in the housing;
   c. a plurality of batteries electrically connected to the motor, wherein the plurality of batteries includes a first group of batteries and a second group of batteries, the first group of batteries electrically connected in parallel to each other, the second group of batteries electrically connected in parallel to each other, and the first group of batteries electrically connected in series to the second group of batteries;
   d. a blade coupled to the motor, at least a portion of the blade positioned outside of the housing so that at least a portion of the blade is configured to be positioned in an interior space of the container when the housing is coupled to the container; and
   e. a user input device that is operable to cause power to be sent from the plurality of batteries to the motor so that the motor rotates the blade.

15. The assembly of claim 14, wherein the plurality of batteries are positioned around substantially the entire circumference of the motor.

16. The assembly of claim 14, wherein an inner surface of the housing has a plurality of receptacles each receiving one of the plurality of batteries.

17. The assembly of claim 14, further comprising a charging port that is electrically connected to a battery management system, the battery management system electrically connected to the plurality of batteries and configured to transmit power from the charging port to the plurality of batteries.

18. The assembly of claim 17, further comprising a control system electrically connected to the motor, the control system further electrically connected to at least one of the battery management system or the plurality of batteries, and wherein the control system is operable to transmit power from the plurality of batteries to the motor when the user input device is activated.

19. The assembly of claim 18, wherein the control system comprises a MOSFET or transistor that is operable to transmit power from the plurality of batteries to the motor when the user input device is activated.

20. The assembly of claim 14, wherein the housing comprises a side wall formed from extruded aluminum.

21. The assembly of claim 14, further comprising an axial seal positioned between the blade and the housing, and a radial seal positioned between a shaft of the motor and a portion of the housing.

22. The assembly of claim 14, wherein the housing comprises a bushing that is over-molded into a molded section of the housing, and wherein a shaft of the motor is received in the bushing.

23. The assembly of claim 14, wherein the container comprises an outer wall and an inner wall that is spaced from the outer wall to define an enclosed space positioned between the outer wall and the inner wall, wherein the enclosed space is at least a partial vacuum, wherein the container defines a mouth through which an interior space of the container is accessible.

24. The assembly of claim 23, wherein the housing is configured to be removably coupled to the container so that the housing substantially seals the mouth of the container.

25. The assembly of claim 24, further comprising a safety switch that is configured to sense when the housing is coupled to the container and prevent operation of the motor when the housing is not coupled to the container.

26. The assembly of claim 25, wherein the housing comprises a seal that is configured to engage the container when the housing is coupled to the container, wherein the seal is positioned between the safety switch and the container when the housing is coupled to the container.

27. The assembly of claim 23, wherein the housing is configured to be coupled to a first end of the container, and wherein the mouth is at a second end of the container.

28. The assembly of claim 14, wherein each of the plurality of batteries is positioned at least partially in the housing radially outward from the motor, and wherein the plurality of batteries are positioned circumferentially around the motor.

29. An assembly for a portable blender comprising:
   a. a housing configured for coupling to a container;
   b. a motor positioned at least partially in the housing;
   c. a plurality of batteries electrically connected to the motor;
   d. a blade coupled to the motor, at least a portion of the blade positioned outside of the housing so that at least a portion of the blade is configured to be positioned in an interior space of the container when the housing is coupled to the container;
   e. a user input device that is operable to cause power to be sent from the plurality of batteries to the motor so that the motor rotates the blade;
   f. an axial seal positioned between the blade and the housing; and
   g. a radial seal positioned between a shaft of the motor and a portion of the housing.

30. The assembly of claim 29, wherein each of the plurality of batteries is positioned at least partially in the housing radially outward from the motor, and wherein the plurality of batteries are positioned circumferentially around the motor.

31. An assembly for a portable blender comprising:
   a. a housing configured for coupling to a container, wherein the housing comprises a bushing that is over-molded into a molded section of the housing;
   b. a motor positioned at least partially in the housing, wherein a shaft of the motor is received in the bushing;
   c. a plurality of batteries electrically connected to the motor;
   d. a blade coupled to the motor, at least a portion of the blade positioned outside of the housing so that at least a portion of the blade is configured to be positioned in an interior space of the container when the housing is coupled to the container; and
   e. a user input device that is operable to cause power to be sent from the plurality of batteries to the motor so that the motor rotates the blade.

32. The assembly of claim 31, wherein each of the plurality of batteries is positioned at least partially in the housing radially outward from the motor, and wherein the plurality of batteries are positioned circumferentially around the motor.

* * * * *